United States Patent [19]

Plotner et al.

[11] Patent Number: 5,791,439
[45] Date of Patent: Aug. 11, 1998

[54] LADDER, MEMBER FOR CONNECTING A RAIL TO A HORIZONTAL ELEMENT OF A LADDER, AND METHOD, AND APPARATUS AND METHOD FOR HOLDING A WASHER

[75] Inventors: David E. Plotner; Edward E. Heald, both of Greenville; Kevin L. McIntire, Sandy Lake; Richard P. Sulecki, Greenville; Mitchell H. Hetrich, Greenville; Frederick J. Bartnicki, Greenville, all of Pa.

[73] Assignee: Werner Co., Greenville, Pa.

[21] Appl. No.: 426,194

[22] Filed: Apr. 21, 1995

Related U.S. Application Data

[63] Continuation-in-part of Ser. No. 272,154, Jul. 8, 1994, Pat. No. 5,636,706.
[51] Int. Cl.$^6$ .......................................................... E06C 7/10
[52] U.S. Cl. ................................................ 182/219; 182/220
[58] Field of Search ................................. 182/117, 220, 182/228; 411/372, 145, 532

[56] References Cited

U.S. PATENT DOCUMENTS

| | | | |
|---|---|---|---|
| 1,431,662 | 10/1922 | Horning | 248/300 |
| 3,005,513 | 10/1961 | Carson | 182/228 |
| 4,834,216 | 5/1989 | Wallick | 182/46 |
| 4,949,811 | 8/1990 | Bailey | 182/220 |

*Primary Examiner*—Alvin C. Chin-Shue
*Attorney, Agent, or Firm*—Ansel M. Schwartz

[57] ABSTRACT

A member for connecting a rail to a horizontal element of a ladder. The member comprises a first portion that connects to the horizontal member. The member also comprises a second portion which connects to the rail and extends essentially in parallel with the rail. The second portion is integrally connected to the first portion such that the first portion and the second portion are one continuous piece. The second portion is in an angular relationship of less than 90° with the first portion. A member for connecting a rail having a first rail flange and a second rail flange to a horizontal element of a ladder. The member comprises a first arm which connects to the first rail flange and the horizontal member. The member is also comprised of a second arm which connects to the second rail flange and the horizontal member. Additionally, the member comprises a central body which is integrally connected to the second arm and the first arm. The first arm, second arm and central body are one continuous piece, preferably of plastic. A ladder comprised of the member for each rail. A method for using a ladder. The method comprises the steps of placing a load on the ladder. Next there is the step of transferring forces generated from the load to a member connected between a rail of the ladder and a first step of the ladder. The member can include an apparatus for holding a washer. An apparatus for holding a washer. The apparatus comprises a backing having a backing surface. The apparatus also comprises a retainer extending from the backing. The retainer holds the washer. The retainer has a front through which the washer is introduced into the retainer. Additionally, the apparatus comprises a stop extending from the backing. The stop is disposed adjacent to the front of the retainer and prevents the washer from coming out of the retainer when the washer is in the retainer. The present invention pertains to a method for holding a washer. The method comprises the steps of positioning the washer at a front of a retainer. Then there is the step of moving the washer past a stop adjacent the front of the retainer. Next there is the step of seating the washer in the retainer, with the stop preventing the washer from coming out of the retainer.

28 Claims, 39 Drawing Sheets

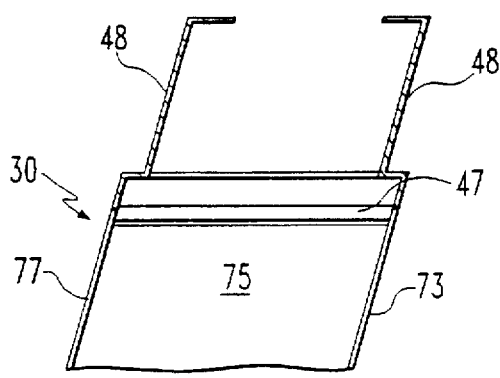
FIG.2A
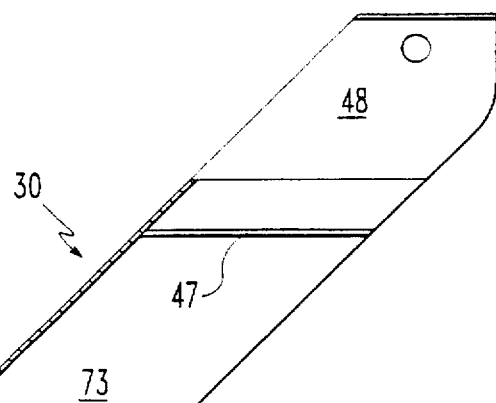
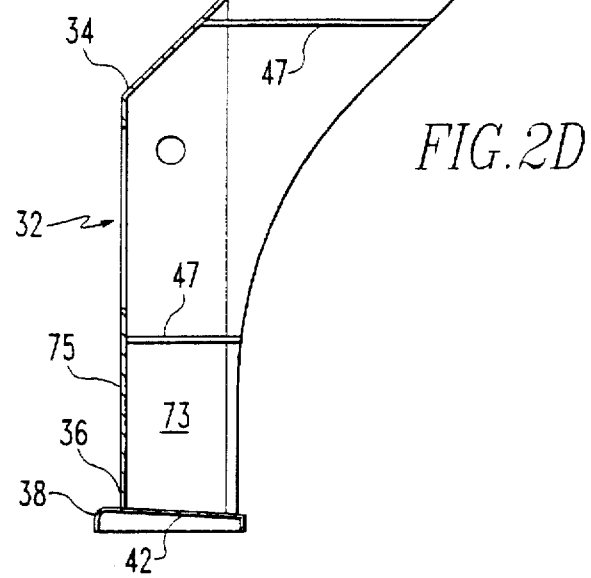
FIG.2D
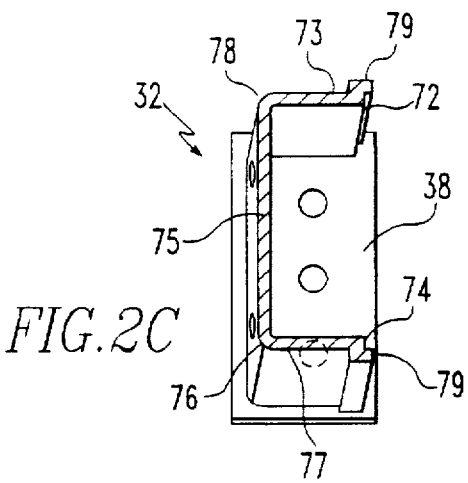
FIG.2C

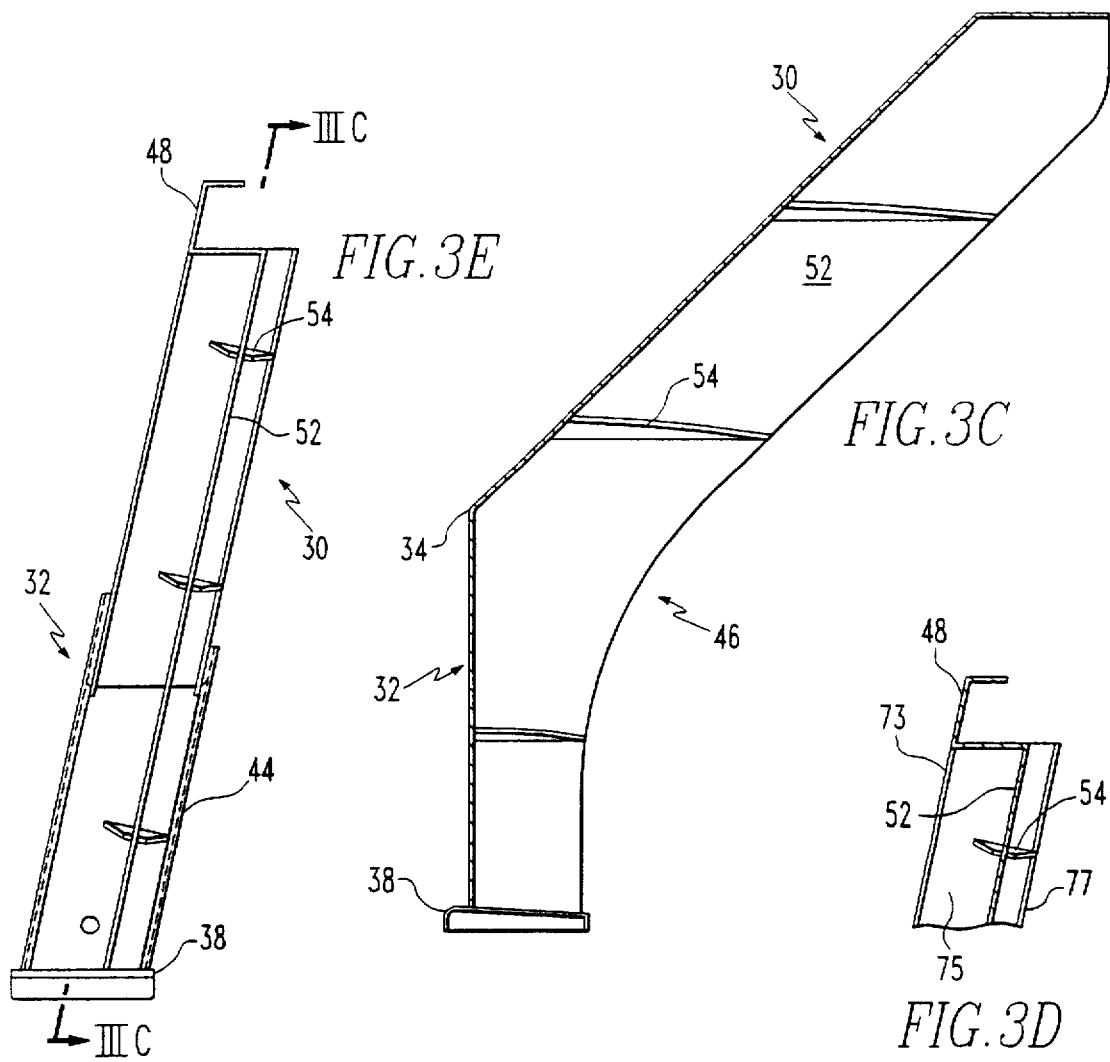

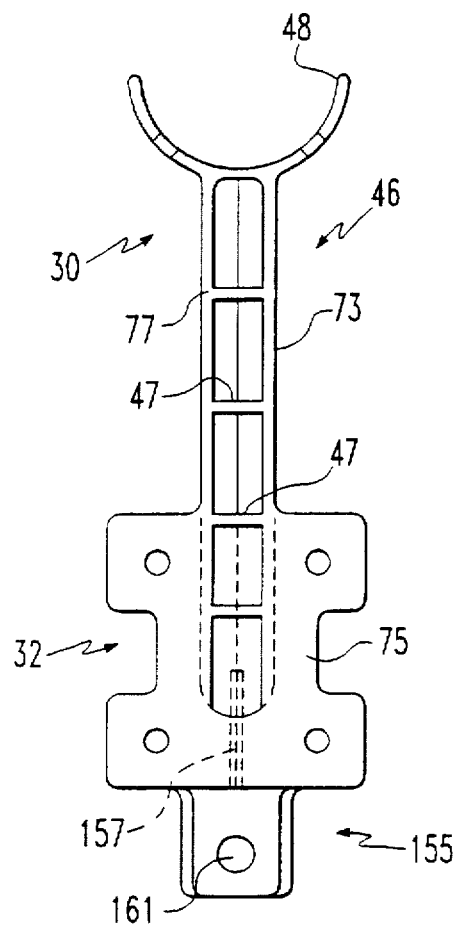
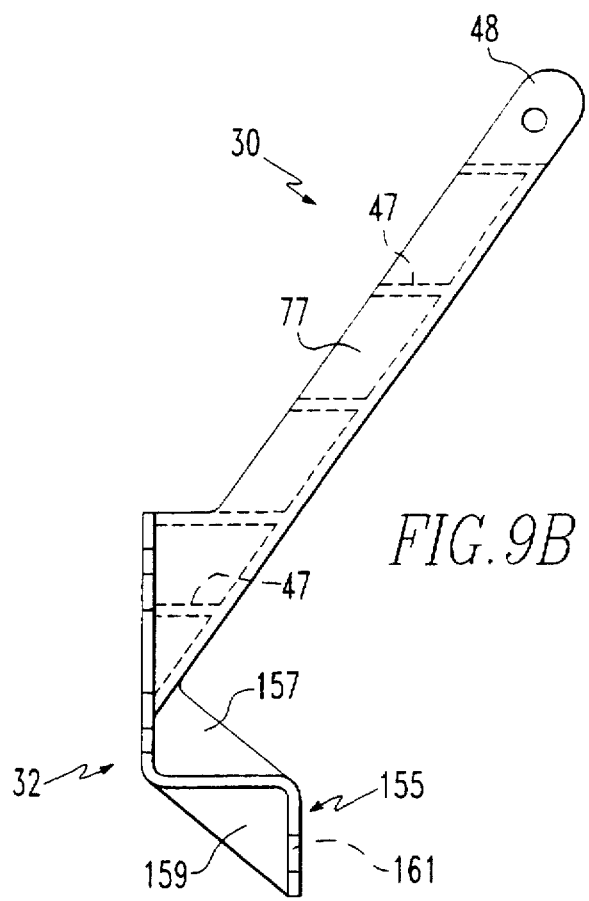
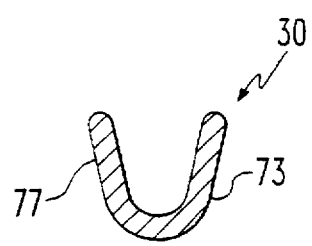
FIG.9A
FIG.9B
FIG.9C

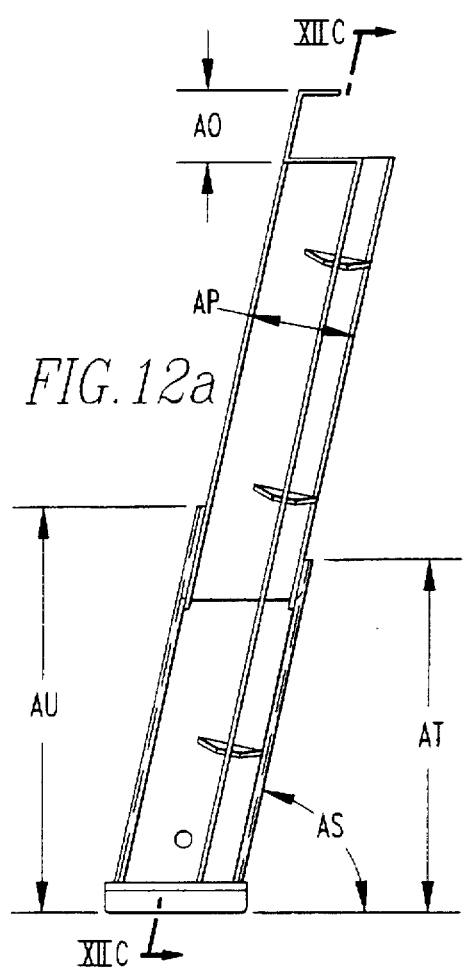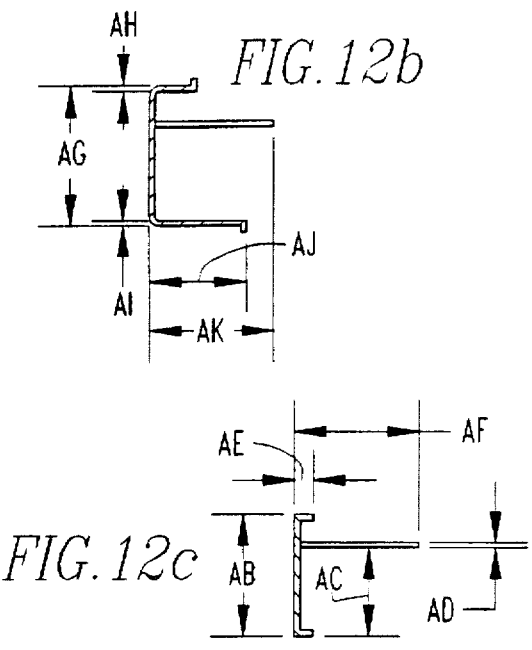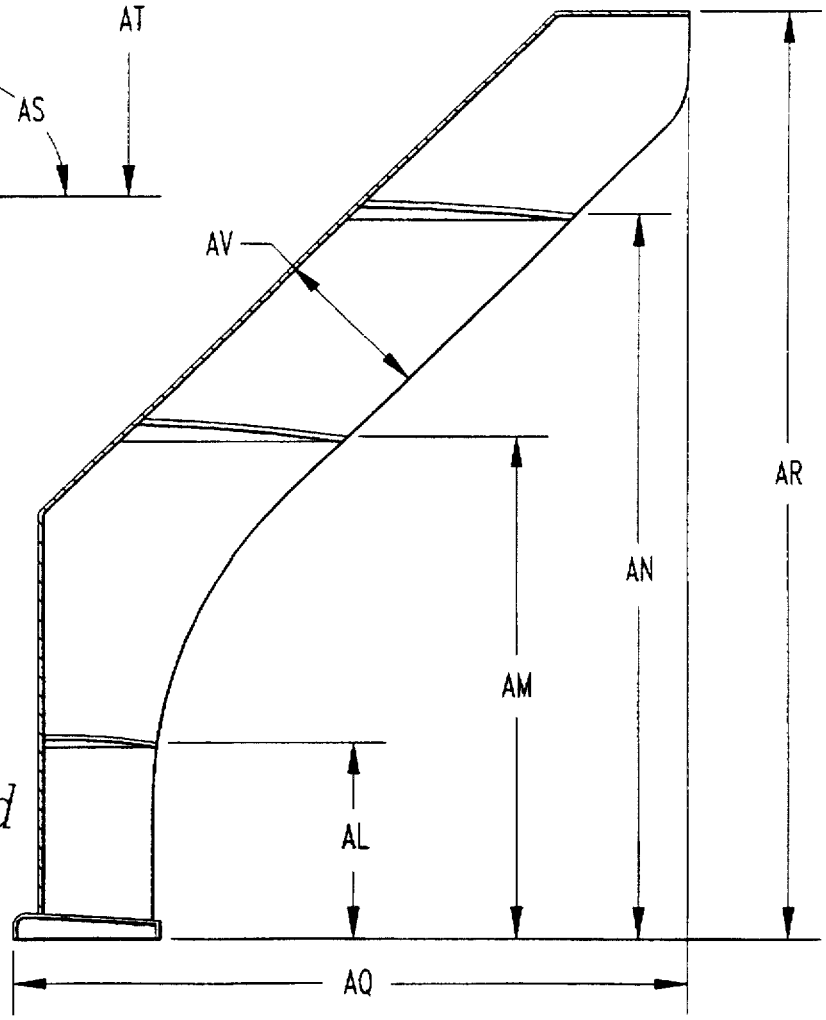

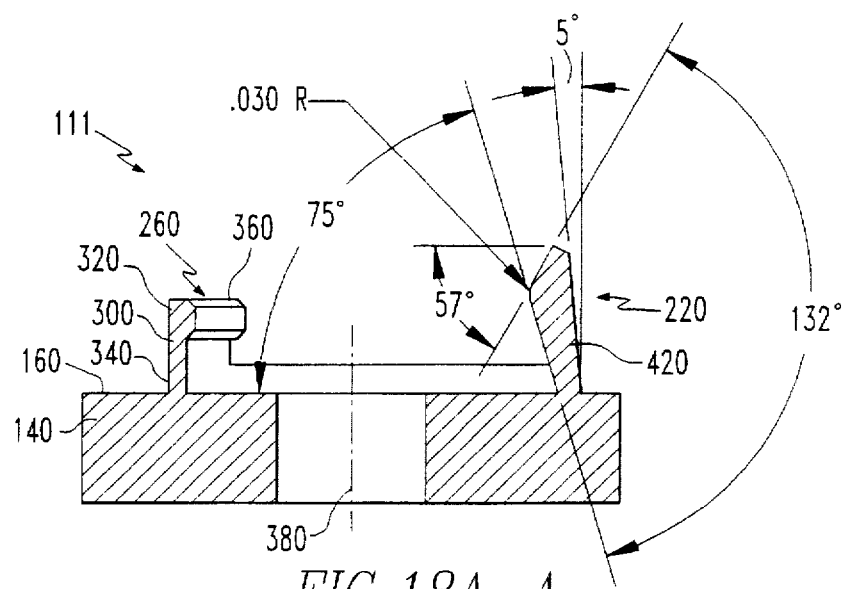
FIG.18A-A
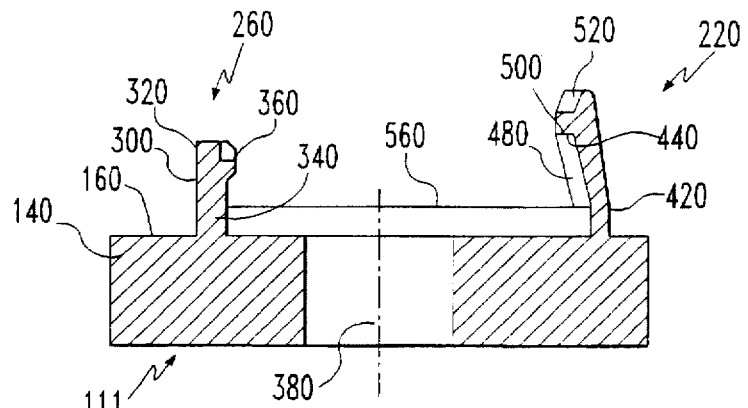
FIG.19A-A
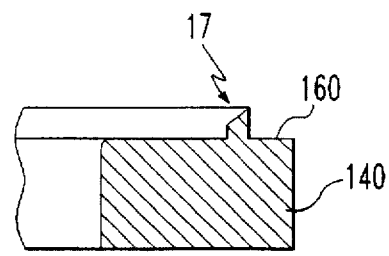
FIG.20B-B

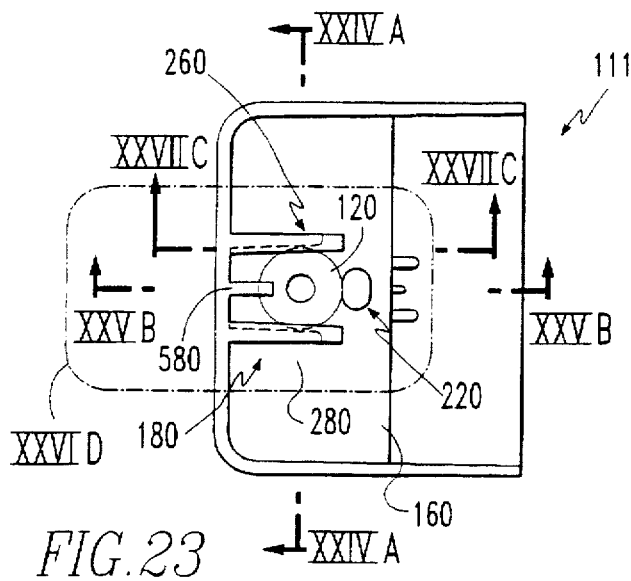
FIG.23
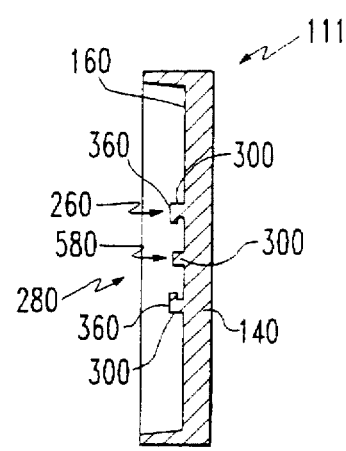
FIG.24A-A
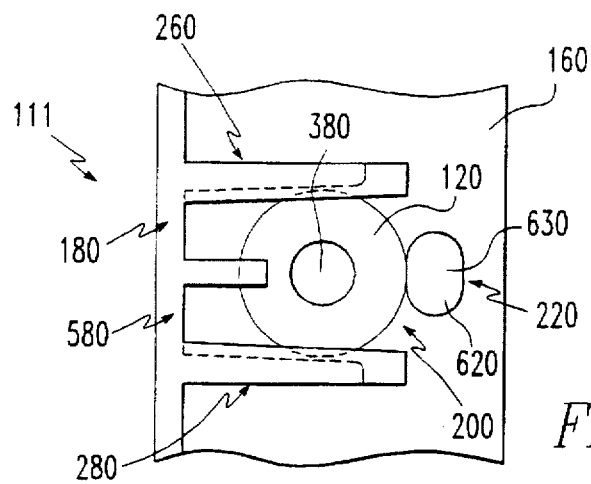
FIG.26D-D
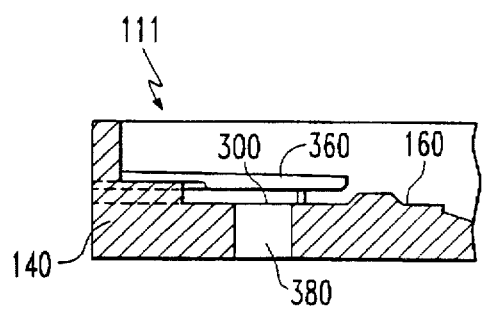
FIG.25B-B
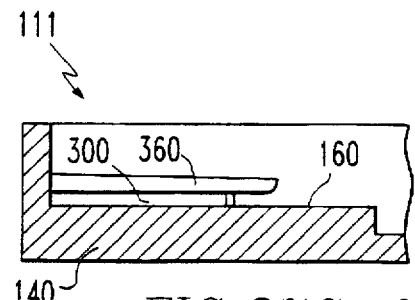
FIG.27C-C

LADDER, MEMBER FOR CONNECTING A RAIL TO A HORIZONTAL ELEMENT OF A LADDER, AND METHOD, AND APPARATUS AND METHOD FOR HOLDING A WASHER

This is a continuation-in-part of application Ser. No. 08/272,154 filed on Jul. 8, 1994, U.S. Pat. No. 5,636,706, issued Jun. 10, 1997.

FIELD OF THE INVENTION

The present invention is related to ladders. More specifically, the present invention relates to a member for connecting a rail to a horizontal element, such as a step or a horizontal of a ladder. Additionally, the present invention is related to a method and apparatus for holding a washer. More specifically, the present invention is related to a method and apparatus for holding a washer so a person's fingers cannot be injured by a riveter.

BACKGROUND OF THE INVENTION

Ladders experience horizontal as well as vertical forces while they are used. To better respond to the horizontal forces that may be experienced by the ladder, knee braces have been used to connect the bottom step or horizontal with a rail. The present invention is directed to an improved knee brace that has been combined with a rail support and preferably a foot to better respond to horizontal forces, and increase manufacturing efficiency.

It is a common practice when riveting two objects together, such as the improved knee brace to the rail of a ladder, if the rivet upset surface is non-metal, to use a washer with a rivet. If it is required of a worker to place the washer in position onto the rivet, there exists the possibility that the operation of the riveter can cause injury to the fingers of the worker. The present invention eliminates the need for a worker to place his fingers into a position where the riveter can injure the fingers of the worker.

SUMMARY OF THE INVENTION

The present invention pertains to a ladder. The ladder comprises a first side rail. The ladder also comprises a second side rail essentially in parallel with and adjacent to the first side rail. Additionally, the ladder comprises a first step connected to the first side rail in proximity to its bottom and to the second side rail in proximity to its bottom. The first step is essentially perpendicular with the first and second side rails. There is a first front member for connecting a first rail to the first step and a second front member for connecting the second side rail to the first step. Each front member comprises a first portion that connects to the step. Each front member also comprises a second portion which connects to the rail and extends essentially in parallel with the rail of the ladder. The second portion is integrally connected to the first portion such that the first portion and the second portion are one continuous piece. The second portion is in an angular relationship of less than 90° with the first portion. Preferably, the first and second portions have apparatuses for holding a washer.

The present invention also pertains to a member for connecting a rail to a horizontal element of a ladder. The member comprises a first portion that connects to the horizontal member. The member also comprises a second portion which connects to the rail and extends essentially in parallel with the rail. The second portion is integrally connected to the first portion such that the first portion and the second portion are one continuous piece. The second portion is in an angular relationship of less than 90° with the first portion. Preferably, the first and second portions have apparatuses for holding a washer.

The present invention pertains to a member for connecting a rail having a first rail flange and a second rail flange to a horizontal element of a ladder. The member comprises a first arm which connects to the first rail flange and the horizontal member. The member is also comprised of a second arm which connects to the second rail flange and the horizontal member. Additionally, the member comprises a central body which is integrally connected to the second arm and the first arm. The first arm, second arm and central body are one continuous piece, preferably of plastic. Preferably, the first arm, second arm and central body have apparatuses for holding a washer.

The present invention also pertains to a method for using a ladder. The method comprises the steps of placing a load on the ladder. Next there is the step of transferring forces generated from the load to a member connected between a rail of the ladder and a first step of the ladder. The member has a first portion that connects to the horizontal element. The member also has a second portion which connects to the rail and extends essentially in parallel with the rail of the ladder. The second portion is integrally connected to the first portion such that the first portion and second portion are one continuous piece. The second portion is in an angular relationship of less than 90° with the first portion.

The present invention pertains to a method for holding a washer. The method comprises the steps of positioning the washer at a front of a retainer. Then there is the step of moving the washer past a stop adjacent the front of the retainer. Next there is the step of seating the washer in the retainer, with the stop preventing the washer from coming out of the retainer.

The present invention pertains to a method for connecting a member to a ladder. The method comprises the steps of inserting a washer into a washer holder of the member. Then there is the step of placing the member in contact with the ladder. Next there is the step of riveting the member to the ladder with a rivet which passes through the ladder and the washer in the washer holder of the member.

BRIEF DESCRIPTION OF THE DRAWINGS

In the accompanying drawings, the preferred embodiment of the invention and preferred methods of practicing the invention are illustrated in which:

FIGS. 2, 2a, 2b, 2c, 2d, 2e and 2f are various schematic representations of a front member of the present invention.

FIGS. 3, 3a, 3b, 3c, 3d, 3e, 3f, 3g and 3h are various schematic representations of a rear member of the present invention.

FIGS. 9a, 9b, 9c, 9d and 9e are schematic representations of another embodiment of a member of the present invention for nonsupporting ladders.

FIGS. 12a, 12b, 12c and 12d are schematic representations of a member of the present invention for a stepladder.

FIG. 18A—A is a sectional view of Section A—A of FIG. 15.

FIG. 19A—A is a schematic representation of a sectional view of Section A—A of FIG. 15.

FIG. 20B—B is a sectional view of Section B—B of FIG. 15.

FIG. 23 is a schematic representation of an overhead view of the alternative embodiment of the apparatus.

FIG. 24A—A is a schematic representation of a sectional view of Section A—A of FIG. 23.

FIG. 25B—B is a schematic representation of Section B—B of FIG. 23.

FIG. 26D—D is a schematic representation of Section D—D of FIG. 23.

FIG. 27C—C is a schematic representation of Section C—C of FIG. 23.

DESCRIPTION OF THE PREFERRED EMBODIMENT

Figure 1:
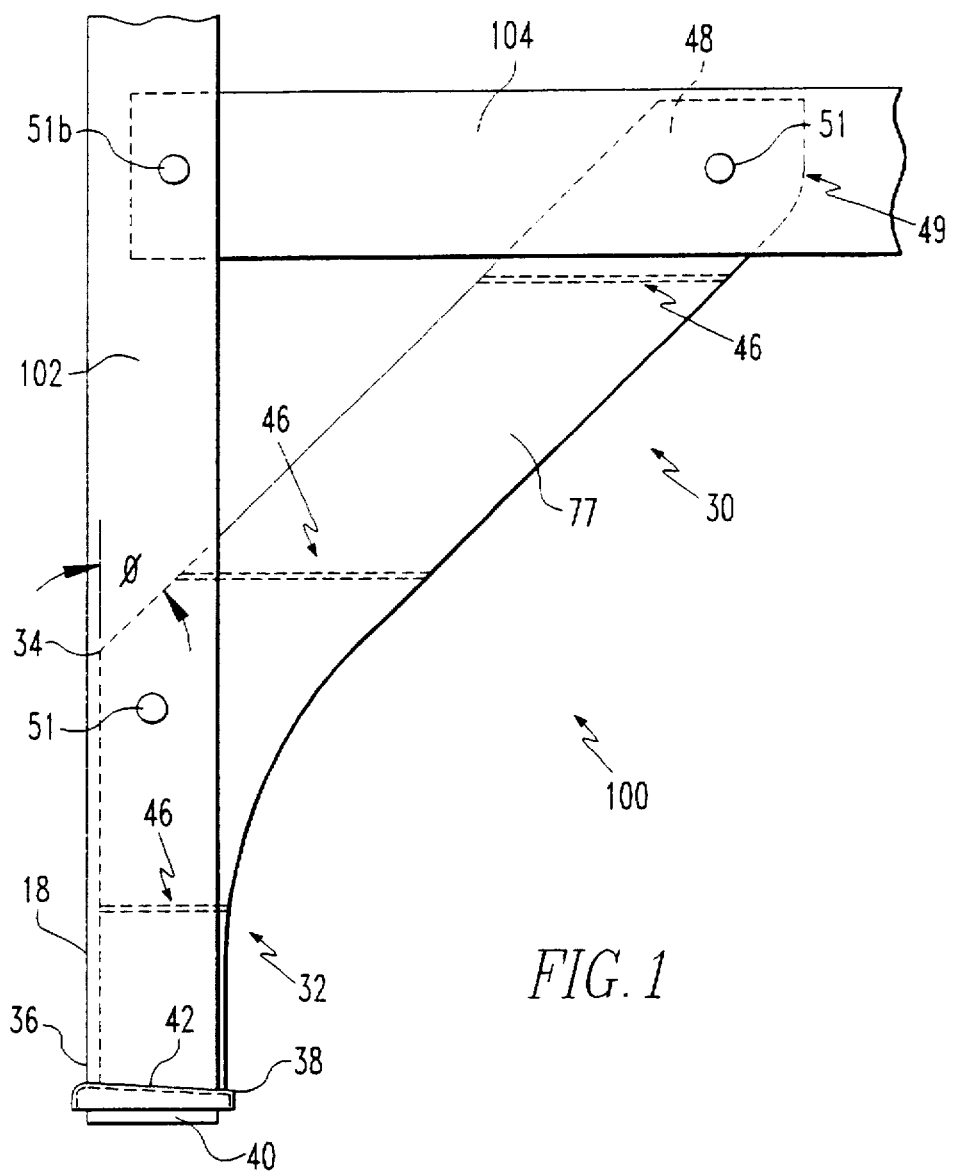
FIG. 1 a schematic representation of a member of the present invention connecting a rail to a horizontal element.
Figure 28:
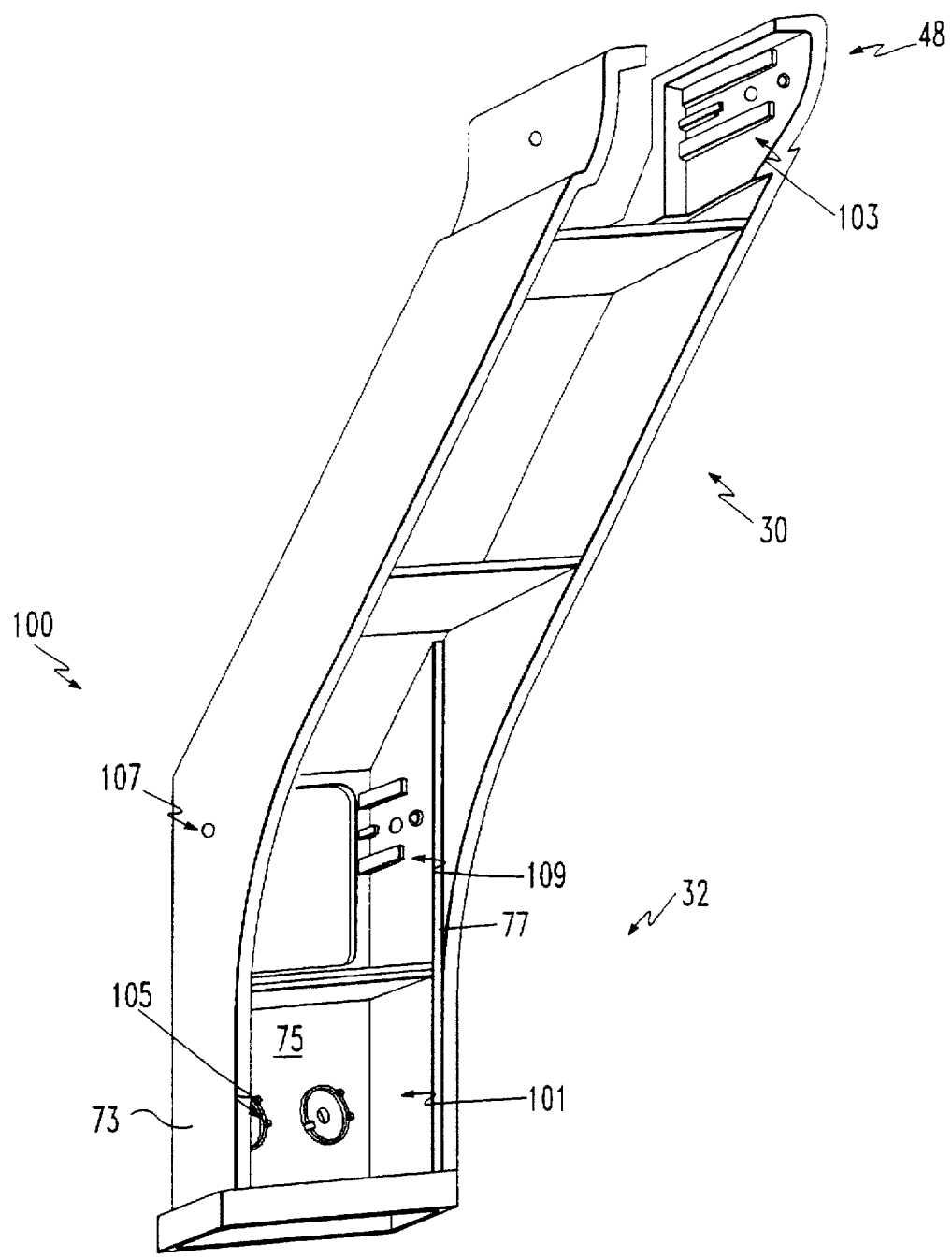
FIG. 28 is a schematic representation of a perspective view of a member of the present invention having apparatuses for holding a washer.
Figure 29:
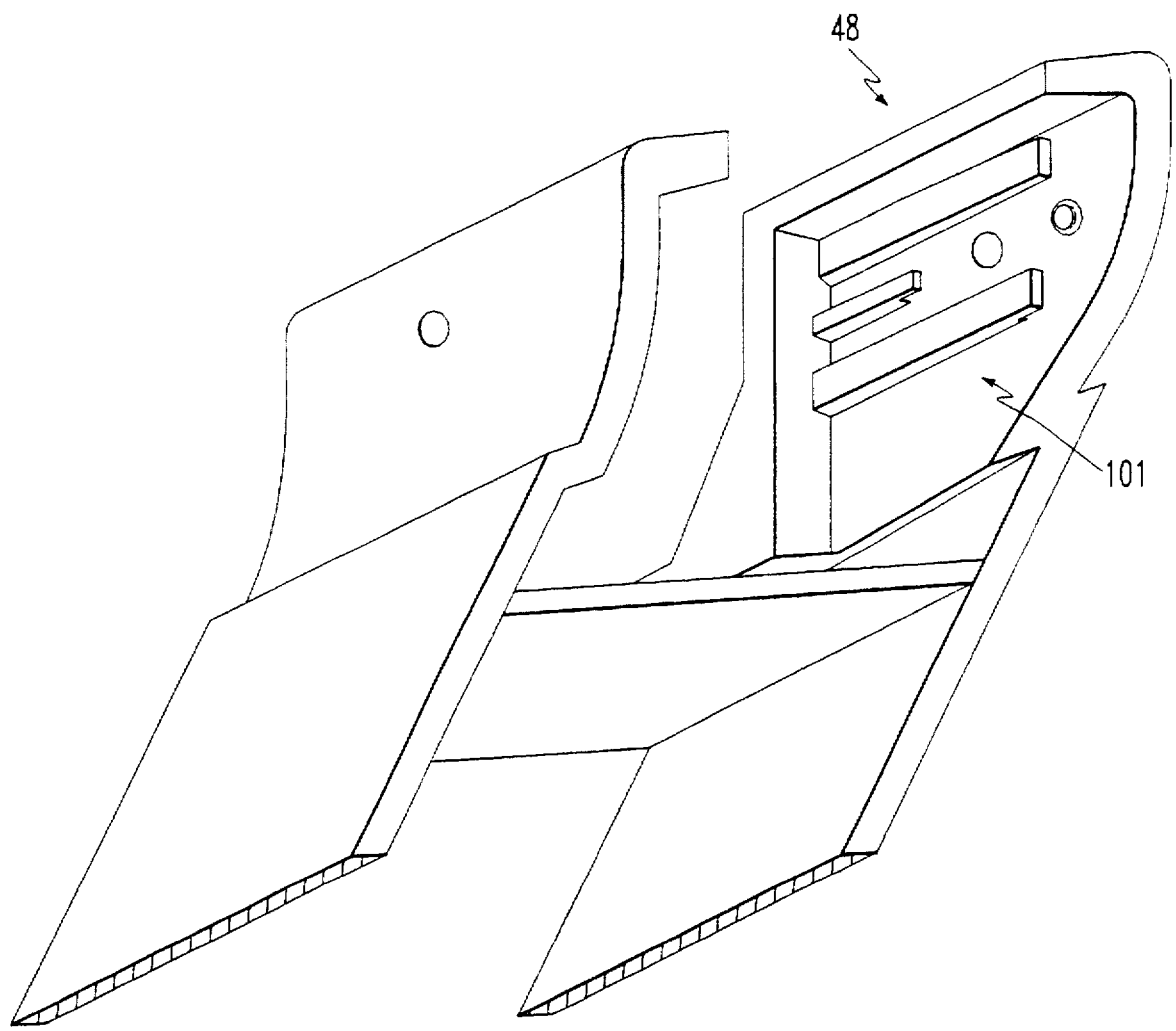
FIG. 29 is a schematic representation of a portion of a member of the present invention which specifically shows a flange.

Referring now to the drawings wherein like reference numerals refer to similar or identical parts throughout the several views, and more specifically to FIGS. 1 and 28 thereof, there is shown a member 100 for connecting a rail 102 to a horizontal element 104, such as a step or a horizontal, of a ladder. The member 100 comprises a first portion 30 that connects to the horizontal member 104. The first portion 30 preferably includes a second apparatus 103 for holding a washer 120. Preferably, the first portion 30 includes a flange portion 48 which connects to the horizontal member 104. The flange portion 48 preferably includes the second apparatus 103 for holding a washer 120, as shown in FIG. 29. Additionally, the member 100 comprises a second portion 32 which connects to the side rail 102 and extends essentially in parallel with the side rail 102. The second portion 32 is integrally connected to the first portion 30 such that the first portion 30 and second portion 32 are one continuous piece. The second portion preferably includes a first apparatus 101 for holding a washer 120. The second portion 32 is in an angular relationship of less than 90° with the first portion 30. Preferably, the first portion 30 forms an angle θ of 30°–60° and preferably 42° with the second portion 32.

The second portion 32 preferably has a first end 34 connected to the first portion 30 and a second end 36. Preferably, the member 100 includes a foot 38 integrally connected to the second end 36 of the second portion 32 to form one continuous piece therewith. Preferably, the foot 38 is angled to be disposed flat relative to the ground when the rail 102 to which it is attached is in an operable position. The foot 38 is disposed to receive the bottom 18 of the side rail 102 so weight on the side rail 102 is transferred to the foot 38 of the second portion 32 when the rail 102 is in an operable position. Preferably, the first portion 30, second portion 32 and foot 38 are one continuous piece of plastic, but the material also could be metal, or a composite, such as graphite or fiberglass. The member 100 preferably includes a foot pad 40 which contacts the ground when the rail 102 to which the member 100 is attached is in an operable position. The foot pad 40 is attached to the bottom 42 of the foot 38. Preferably, the second portion 32 has a contact surface 44 which extends along and conforms with the rail 102 to which it is attached so forces can be transferred therebetween.

Figure 2:
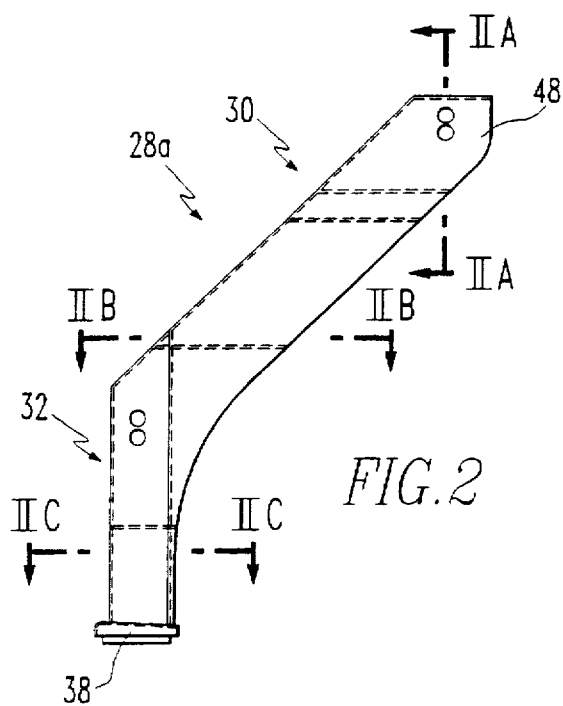
Figure 2E:
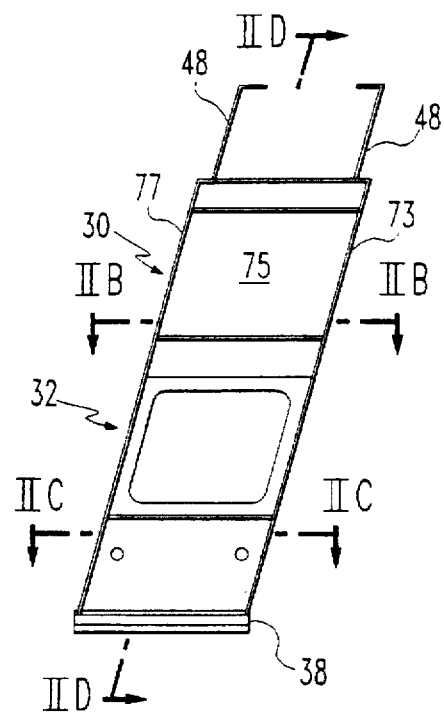
Figure 2F:
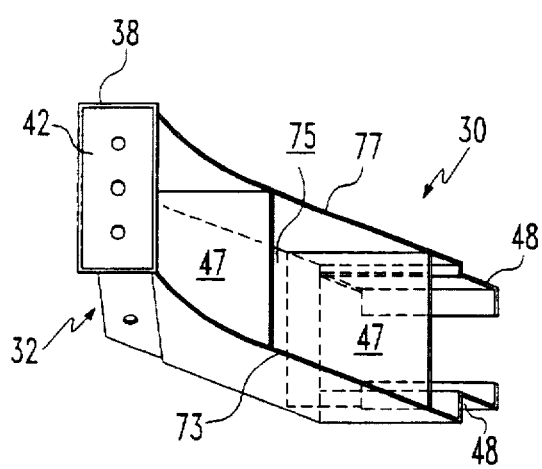
Figure 2B:
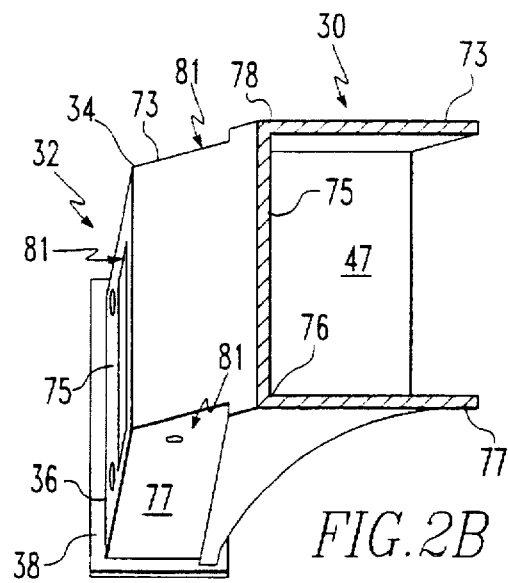

Preferably, the first portion 30 and second portion 32 include buttressing 46. In one embodiment, where the member 100 can be used on a front section 64 of a ladder 10, the first portion 30 and second portion 32 have a C-shaped cross section (although an appropriate structural configuration can be used), and the buttressing 46 includes cross plates 47 disposed in predetermined locations of the first and second portions, as shown in FIGS. 2, 2a, 2b, 2c, 2d, 2e and 2f. Preferably, the C-shaped cross section of the second portion 32 is comprised of a first arm 73, as shown in FIG. 2c. There is a central body 75 to which the first arm 73 is integrally connected at essentially a right angle. The C-shaped cross section of the second portion 32 is also comprised of a second arm 77 which is integrally connected at essentially a right angle to the central body 75 at its end 76 opposite the end 78 the first arm 73 is integrally connected to the central body 75. The first arm 73 and second arm 77 are essentially in parallel with each other. At the end 72 of the first arm 73 and the end 74 of the second arm 77 not connected to the central body 75, there is a second portion flange 79 which extends outward. The second portion flange 79 on the first arm 73 and the second arm 77, the first arm 73, the central body 75 and the second arm 77 define a channel 81, as shown in FIG. 2b, which receive the rail 102. Preferably, the central body 75, first arm 73 and second arm 77 of the second portion 32 has the first apparatus 101 and a third apparatus 105 for holding a washer 120, and a fourth apparatus 107, and a fifth apparatus 109 for holding a washer, respectively, as shown in FIG. 28.

The C-shaped cross section of the first portion 30, as shown in FIG. 2b, has a first arm 73 integrally connected at essentially a right angle with a central body 75, and a second arm 77 integrally connected at essentially a right angle with the central body 75 at the end 76 opposite the end 78 of the central body 75 to which the first arm 73 is connected. The first arm 73 and the second arm 77 of the cross section of the first portion 30 are essentially in parallel. The flange portion 48 of the first portion 30 extends from the first arm 73 and second arm 77, as shown in FIG. 2a. The cross plates 47 are integrally connected with the first arm 73, central body 75 and second arm 77 and form one continuous piece with the first and second portions.

Figure 3:
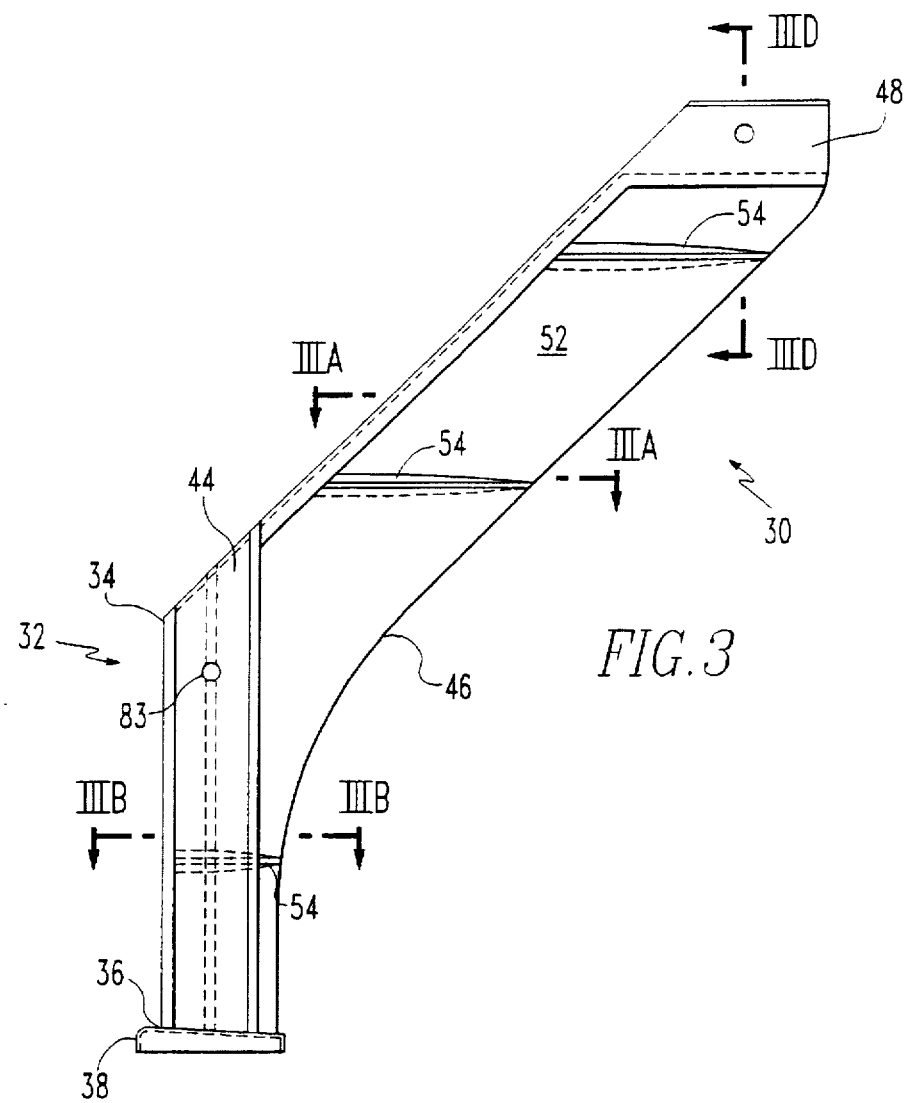
Figure 3F:
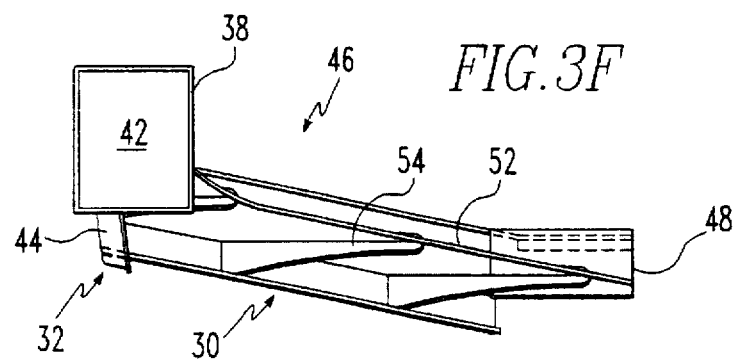
Figure 4:
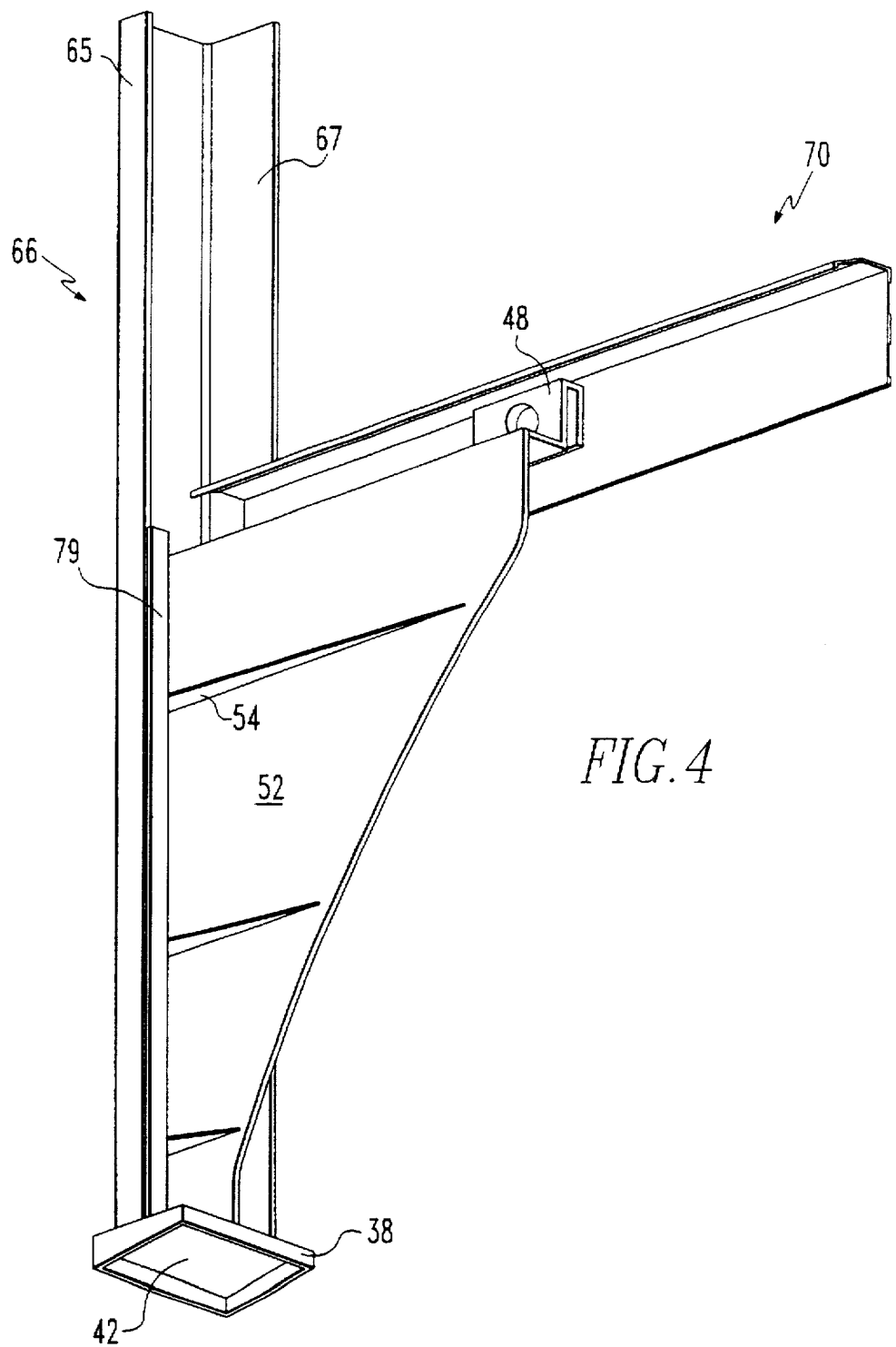
FIG. 4 is a schematic representation of an embodiment of a rear member connected to a horizontal and a rear side rail.

In another embodiment, as shown in FIGS. 3, 3a, 3b, 3c, 3d, 3e, 3f, 3g and 3h, the member 100 can be used on a rear section 74 of a ladder 10. In this embodiment, the first and second portions have a C-shaped cross section, and the buttressing 46 includes a rib 52 extending essentially the length of the member 100. The rib 52 has struts 54. The C-shaped cross section of the second portion 32 preferably has a first arm 73, as shown in FIGS. 3b and 3h. There is also a central body 75 integrally connected with the first arm 73 at one end 78 essentially at a right angle. The C-shaped cross section of the second portion 32 also comprises a second arm 77 integrally connected to the central body 75 at its end 76 opposite the end 78 of the central body 75 connected to the first arm 73. The second arm 77 essentially forms a right angle with the central body 75 and is essentially in parallel with the first arm 73. The first arm 73 is preferably of a shorter length than the second arm 77. The rib 52, struts 54, first arm 73, central body 75 and second arm 77 are one continuous piece. At the end 72 of the first arm 73 and the end 74 of the second arm 77 not connected to the central body 75, there is a second portion flange 79 that extends outward. The second portion flange 79 along with the second arm 77, first arm 73 and central body 75 define a channel 81, as shown in FIG. 3a, to which the rail 102 fits into and specifically contacts the contact surface 44 of the second portion 32. The rib 52 is connected to the central portion 75 offset from its center and closer to the first arm 73. This is because the rear side rail 66 to which the member 100 in this embodiment is connected is typically of a shape that has a first rail flange 65 that is of a shorter width than a second rail flange 67, as shown in FIG. 4. By offsetting the rib 52 in the manner described, it serves to better protect against twisting and failure of the member 100 and compensates for the structural configuration to which the member 100 is connected.

Figure 30:
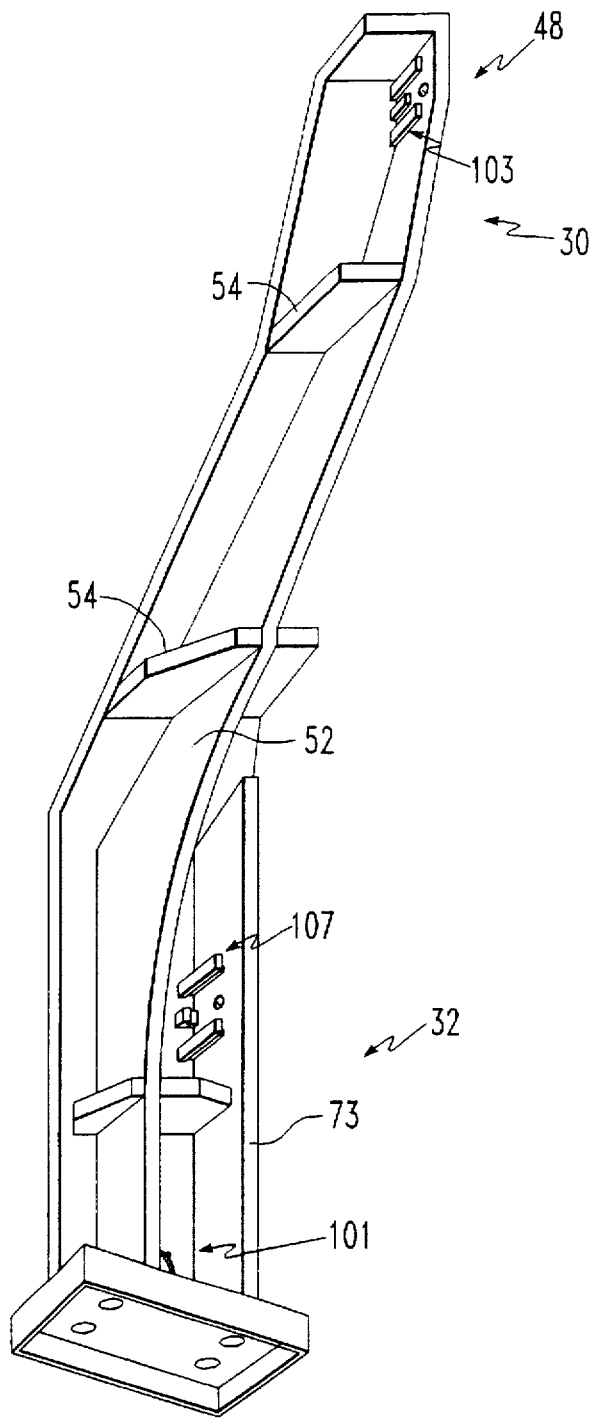
FIG. 30 is a schematic representation of a perspective view of an alternative embodiment of a member of the present invention having apparatuses for holding a washer.
Figure 31:
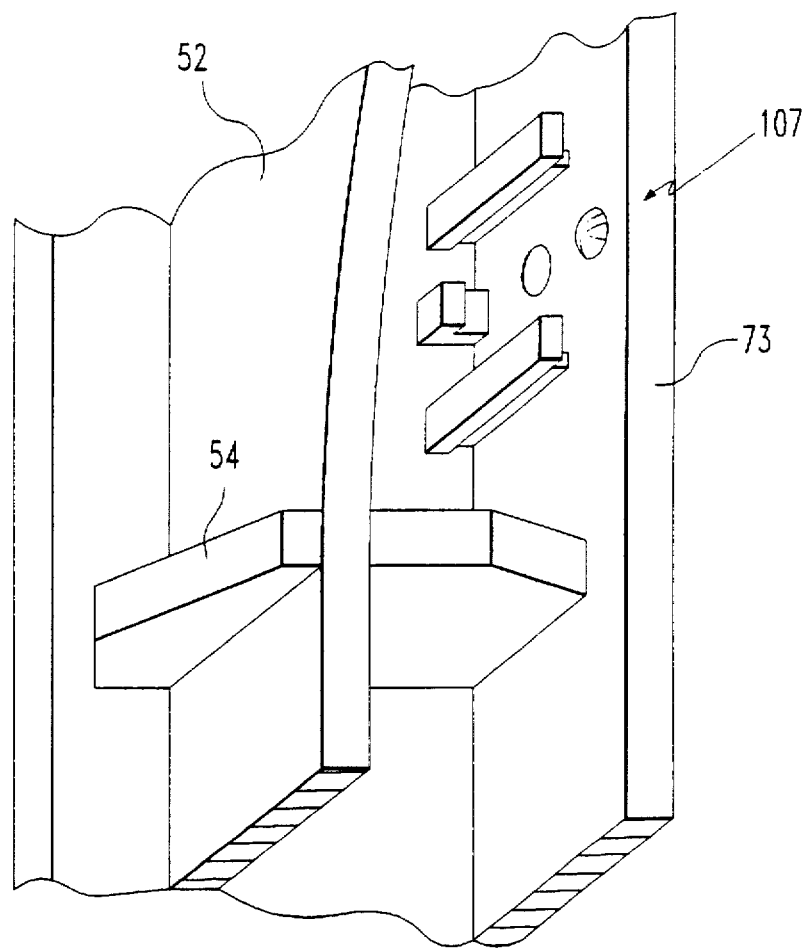
FIG. 31 is a schematic representation of a portion of the alternative embodiment of the member of the present invention which specifically shows a rib and an apparatus for holding a washer.

The C-shaped cross section of the first portion 30, as shown in FIGS. 3a and 3g, also has a first arm 73 integrally connected at essentially a right angle to a central portion 75 and a second arm 77 integrally connected at essentially a right angle to the central body 75 at the end 76 of the central body 75 opposite the end 78 to which the first arm 73 is connected to it. The first arm 73 and second arm 77 of the cross section of the first portion 30 are much smaller relative to the length of the first arm 73 and second arm 77 of the second portion 32. The rib 52 is also connected to the central body 75 offset from its center and closer to the first arm 73 in the same relation as in the second portion 32. The rib 52, struts 54, first arm 73, central body 75 and second arm 77 are one continuous piece. The flange portion 48 extends from the first arm 73. Preferably, the central body 75 has the first apparatus 101 for holding a washer 120, and the first arm 73 has a fourth apparatus 107 for holding a washer 120, respectively, as shown in FIGS. 30 and 31.

Accordingly, the present invention pertains to a member 100 for connecting a rail 102 having a first rail flange 65 and a second rail flange 67 to a horizontal element 104 of a ladder. The member 100 comprises a first arm 73 which connects to the first rail flange 65 and the horizontal member 104. The member 100 is also comprised of a second arm 77 which connects to the second rail flange 67 and the horizontal member 104. Additionally, the member 100 comprises a central body 75 which is integrally connected to the second arm 77 and the first arm 73. The first arm 73, second arm 77 and central body 75 are one continuous piece, preferably of plastic.

Figure 5A:
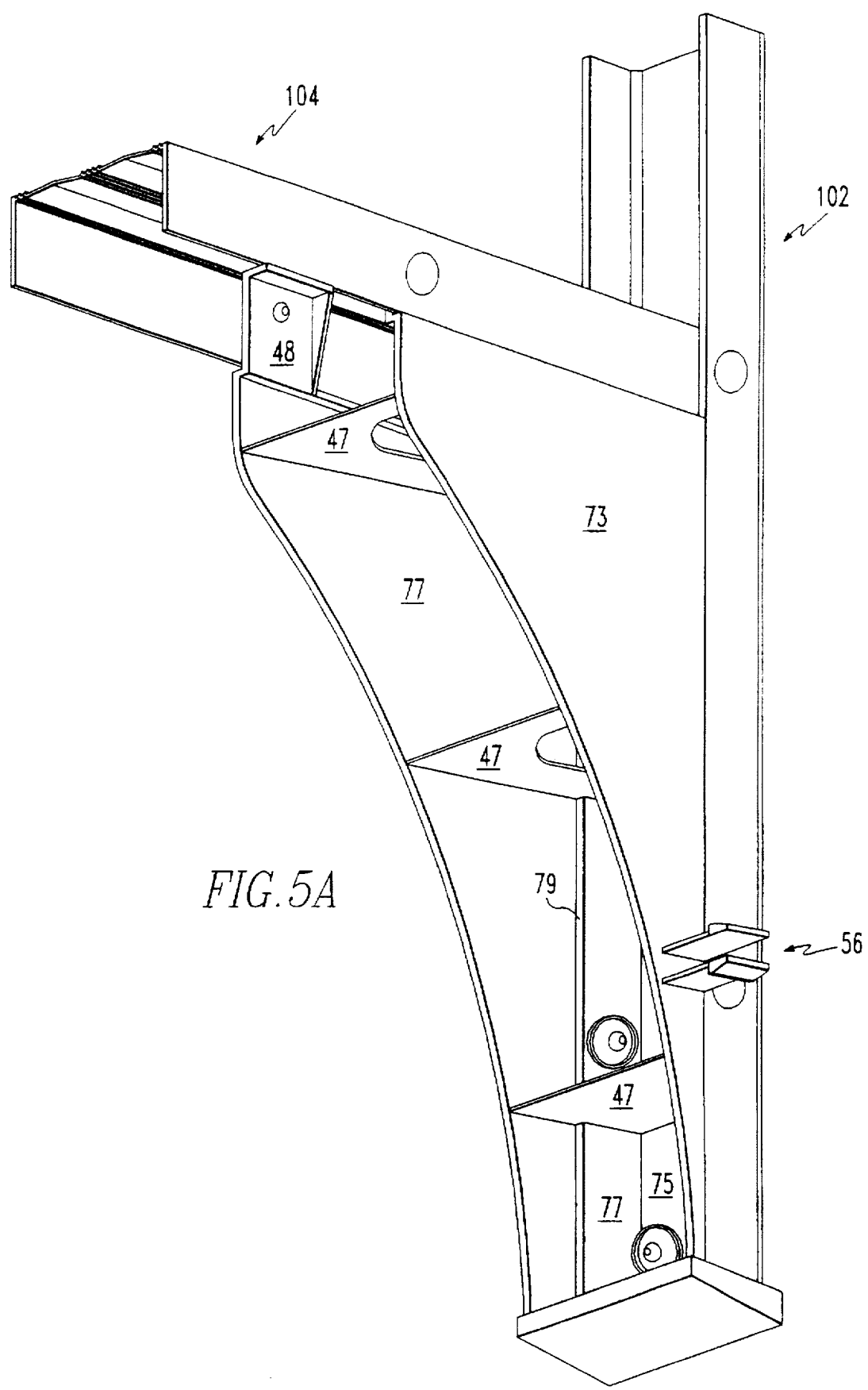
FIG. 5a is a schematic representation of an embodiment of a front member of the present invention connected to a horizontal member and a side rail.
Figure 5B:
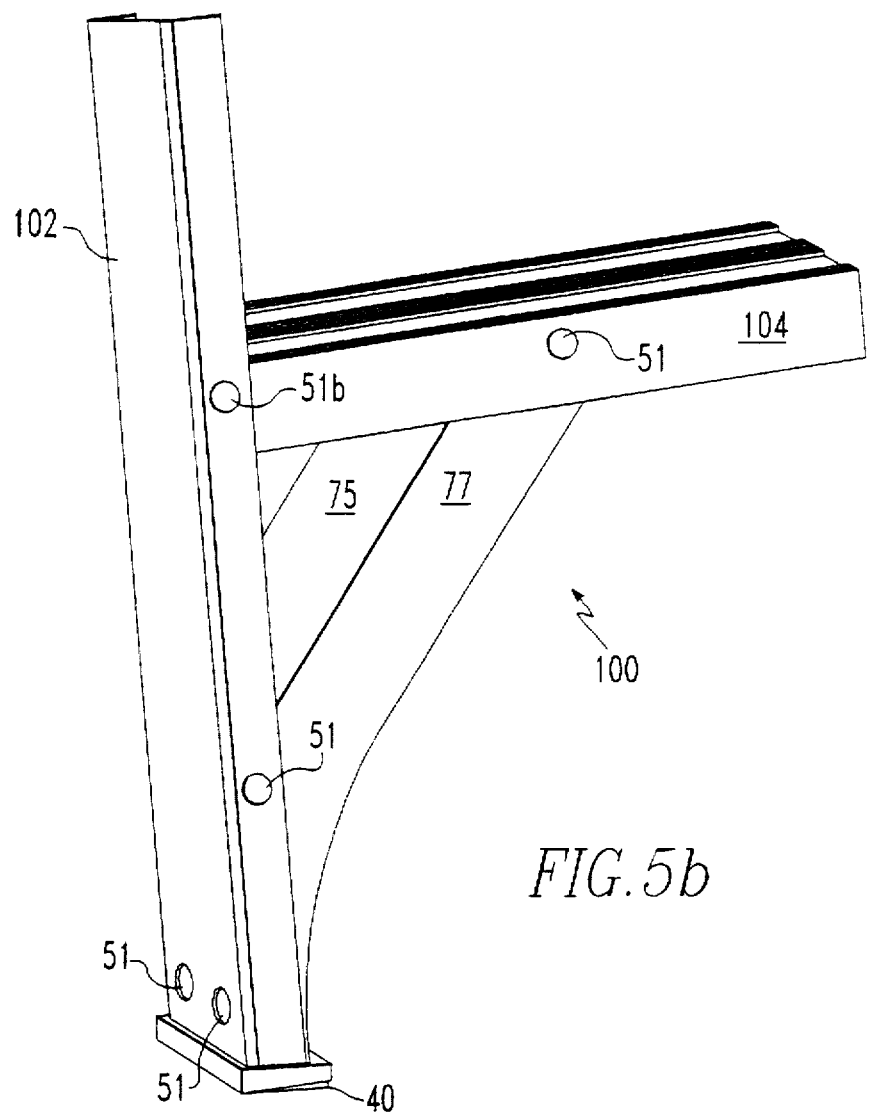
FIGS. 5b, and 5c are schematic representations of a front projected view and an underside projected view, respectively, of another embodiment of a member connected to a horizontal member and a side rail.
Figure 5C:
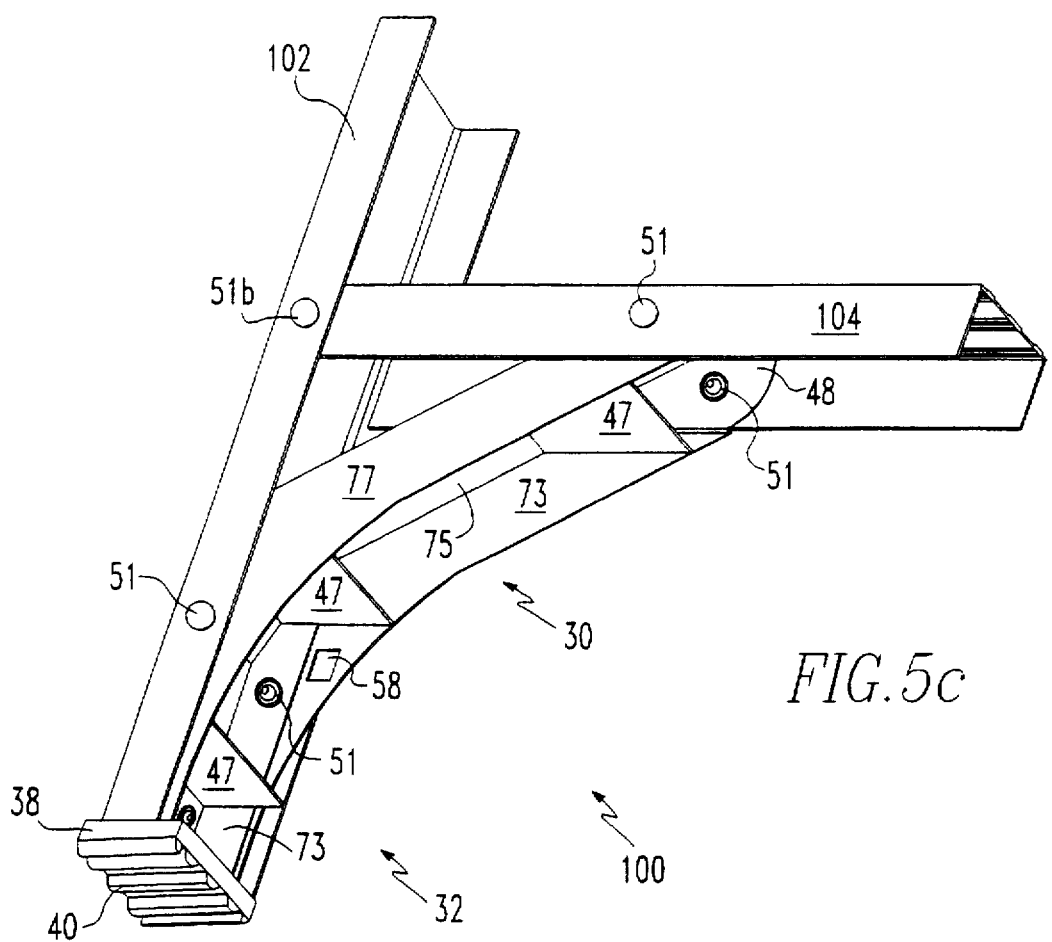
Figure 5D:
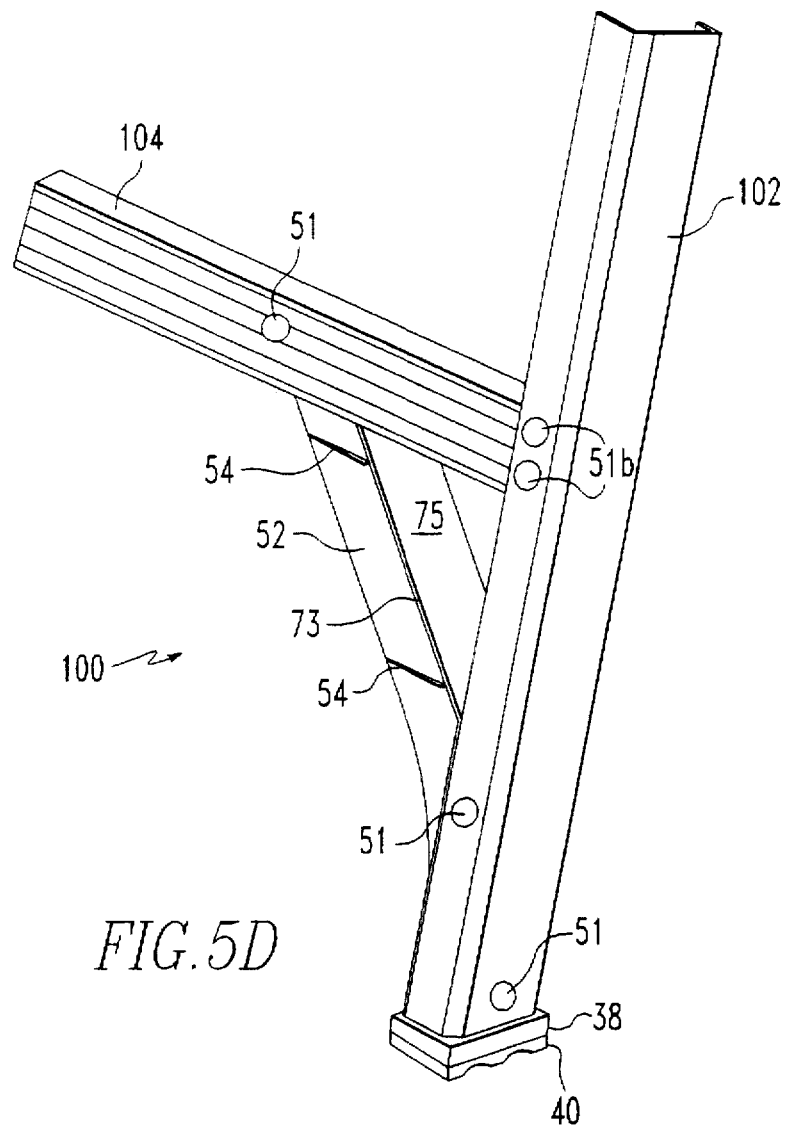
FIGS. 5d and 5e are schematic representations of a front view and an underside projected view, respectively, of yet another embodiment of a member connected to a side rail and a horizontal member.
Figure 5E:
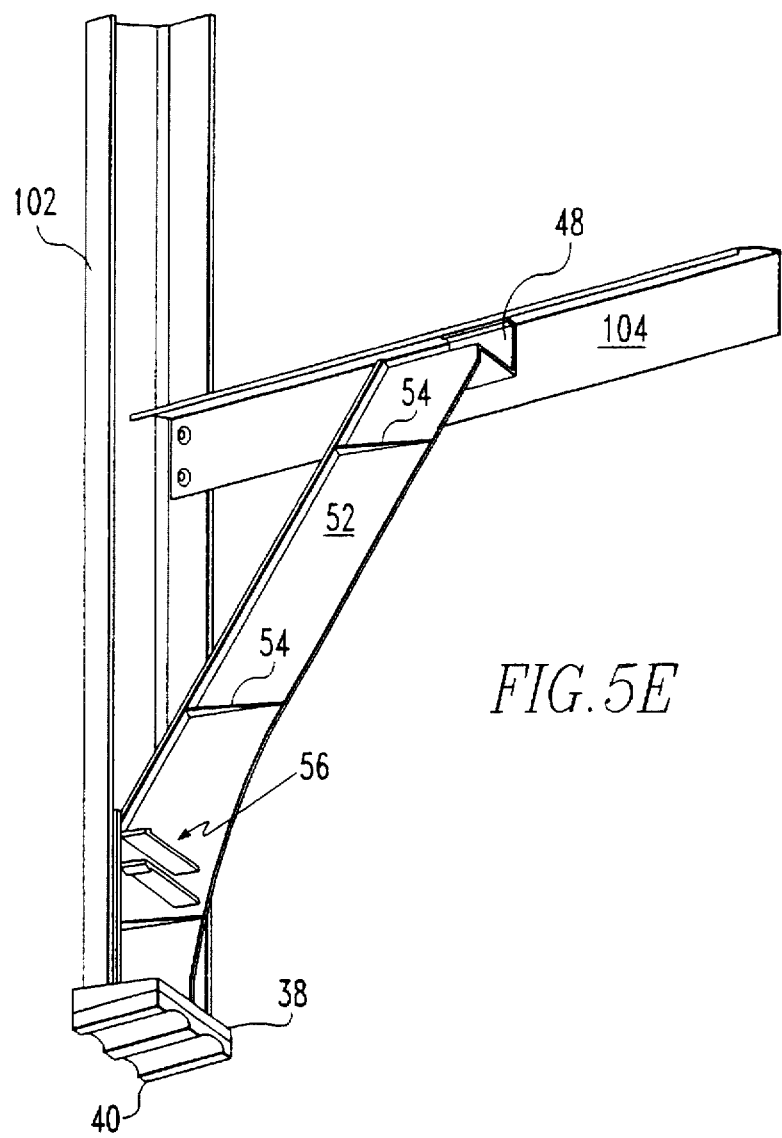
Figure 5F:
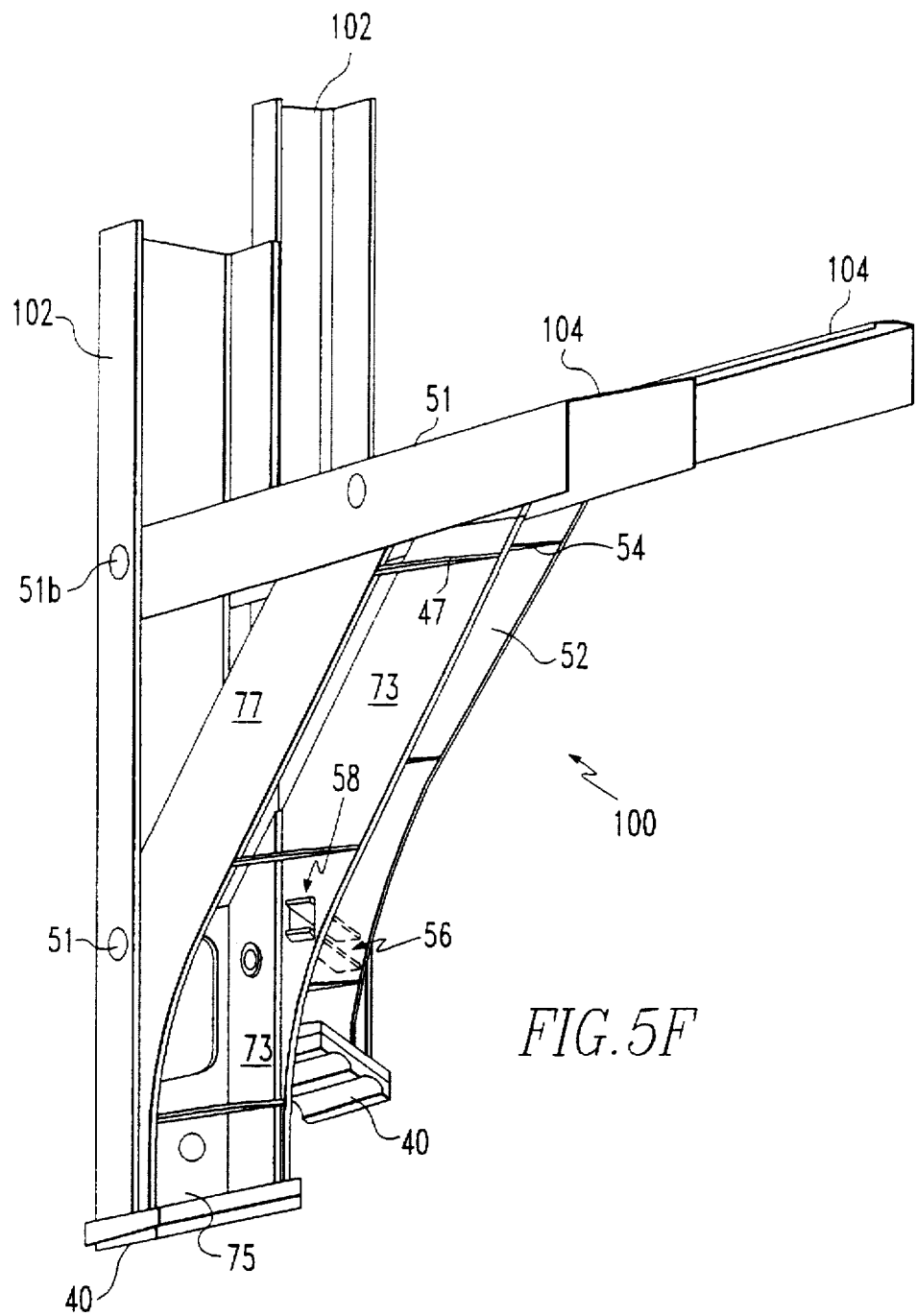
FIGS. 5f, 5g and 5h are underside projected views, side views and close-up side views, respectively, of the embodiment of the member shown in FIGS. 5b and 5c attached with the embodiment of the member shown in FIGS. 5d and 5e.
Figure 5G:
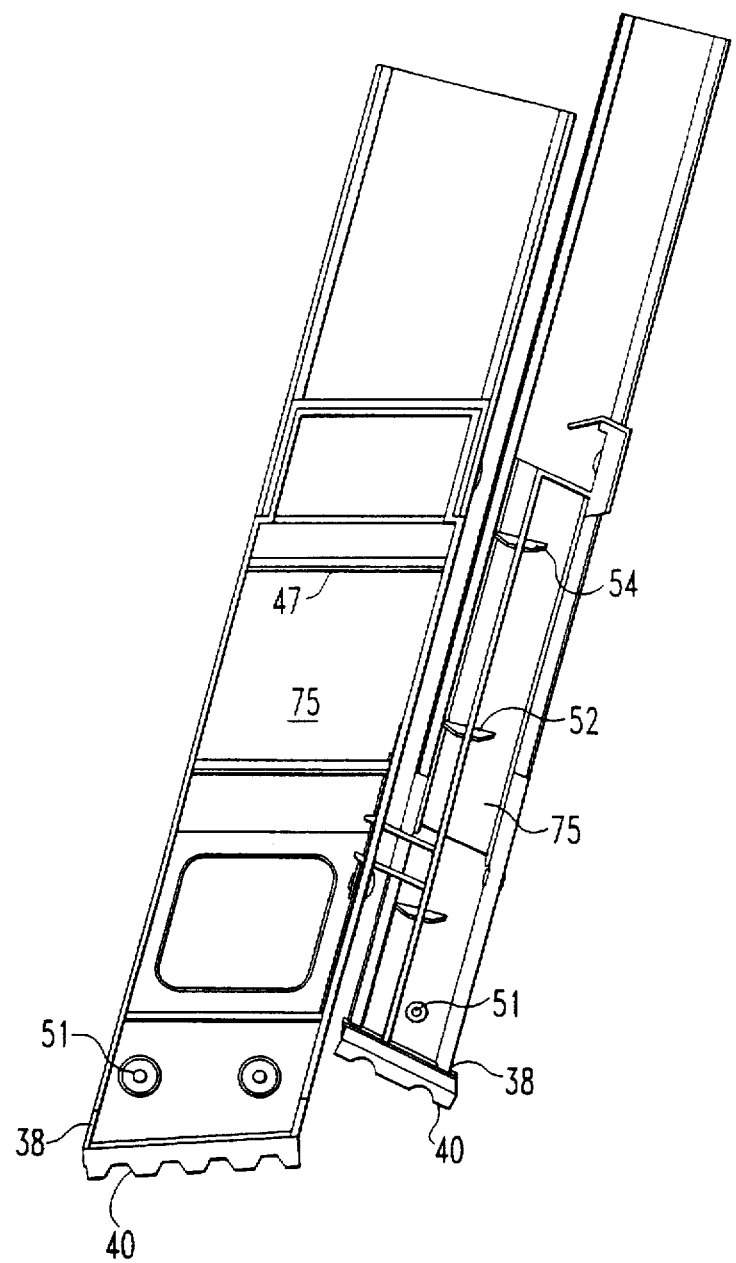
Figure 5H:
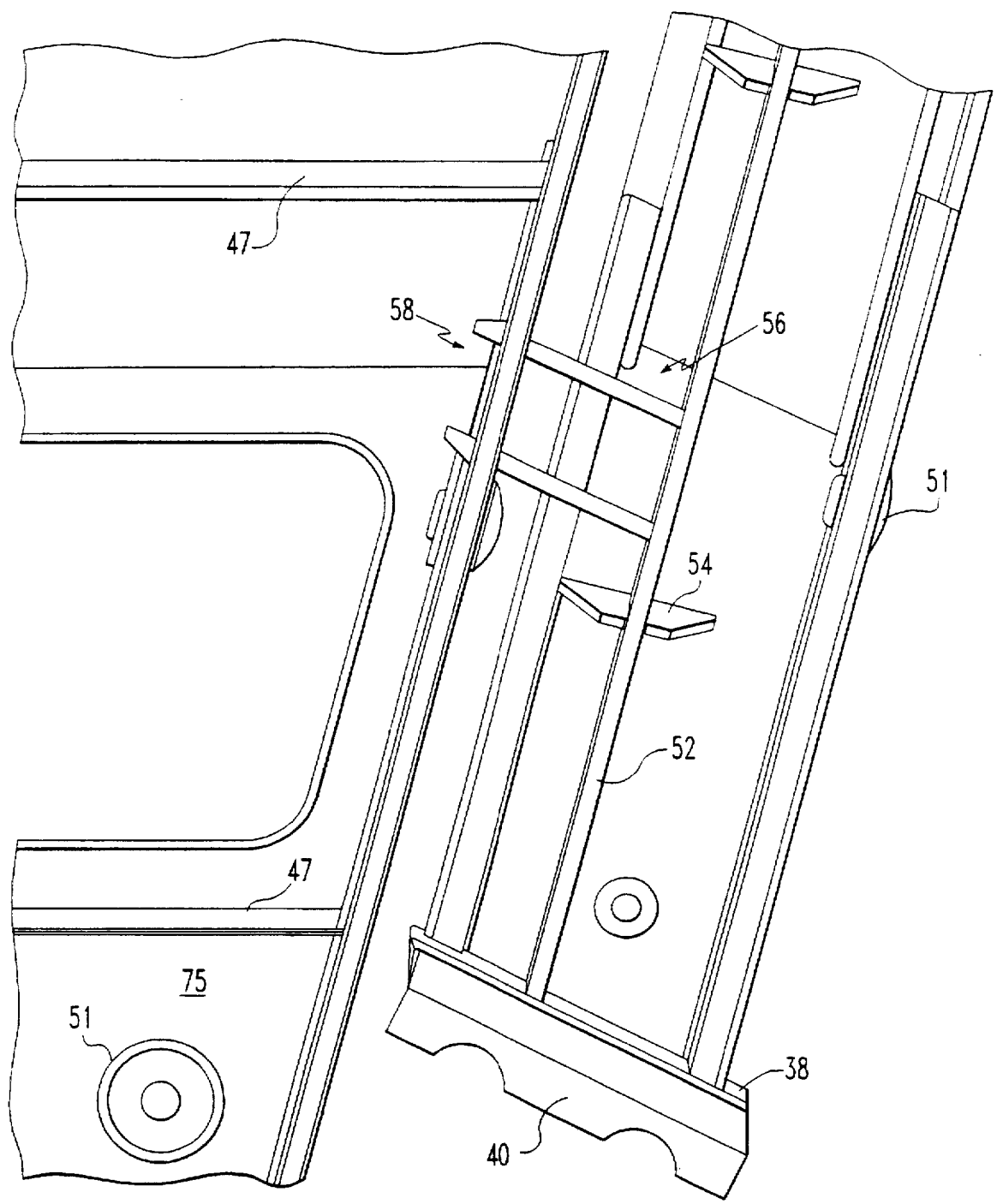

In yet another embodiment, the member has means or a mechanism for connecting the members together. As shown in FIG. 5, the member 100 has the means or mechanism for connecting the members together which includes a clip 56 attached to the first portion 30 or second portion 32 which extends therefrom to connect with a clip receiver 58 of an opposing member in a stepladder. The clip 56 in the clip receiver 58 maintains the rails in fixed spatial relationship so they do not damage each other or their joint connection to a ladder top by shifting relative to each other during transport or overextending the joint, respectively, during transport. Alternatively, the clip 56 can extend from a rib 52 of a member 100 to be used on a rear section 74 of a ladder 10, as shown in FIGS. 5d and 5e. The clip receiver 58 is then disposed in the first wall 73 of a member 100 to be used on a front section 64 of a ladder 100, as shown in FIG. 5b and 5c. The clip 56 in connection with the clip receiver 58 is shown in FIGS. 5f–5h. The clip 56 and clip receiver 58 can also be tabs, velcro, etc., which maintain the rear rail with the associated front rail in fixed spatial relationship.

Figure 6A:
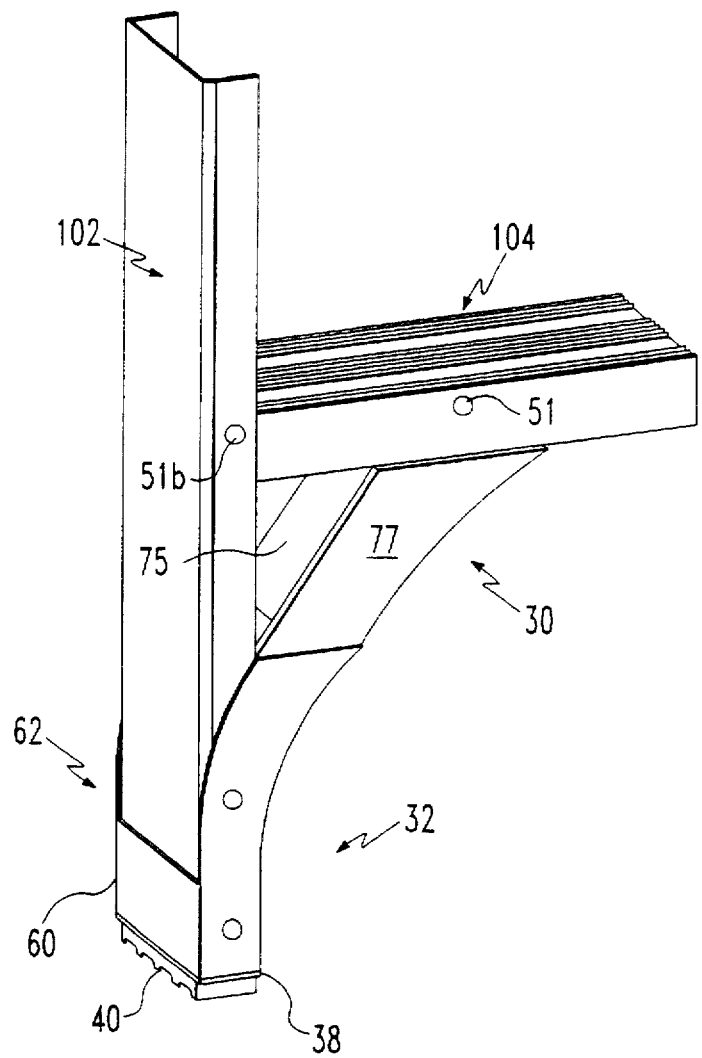
FIGS. 6a, 6b and 6c are schematic representations of a front projected view, an underside projected view and an overhead view, respectively, of yet another embodiment of a member of the present invention connected to a side rail and a horizontal member.
Figure 6B:
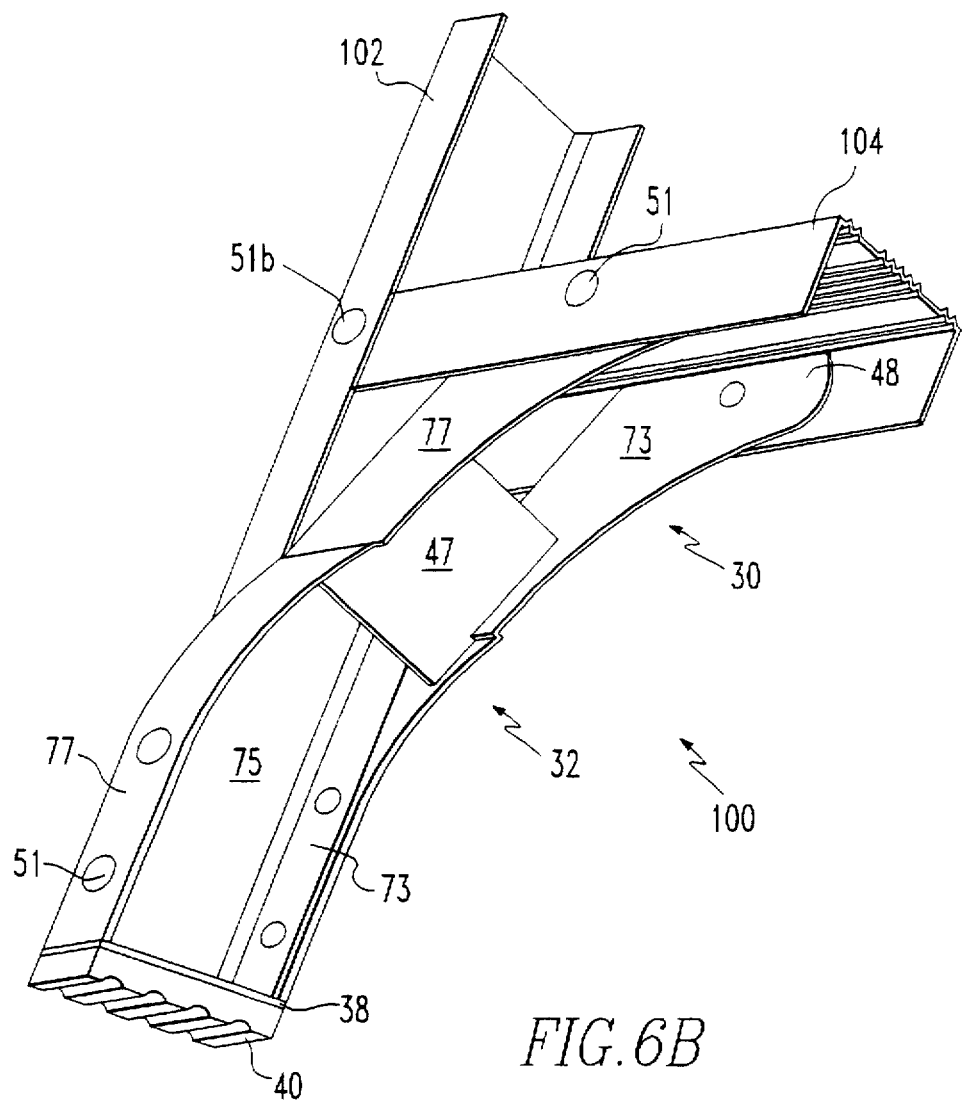
Figure 6C:
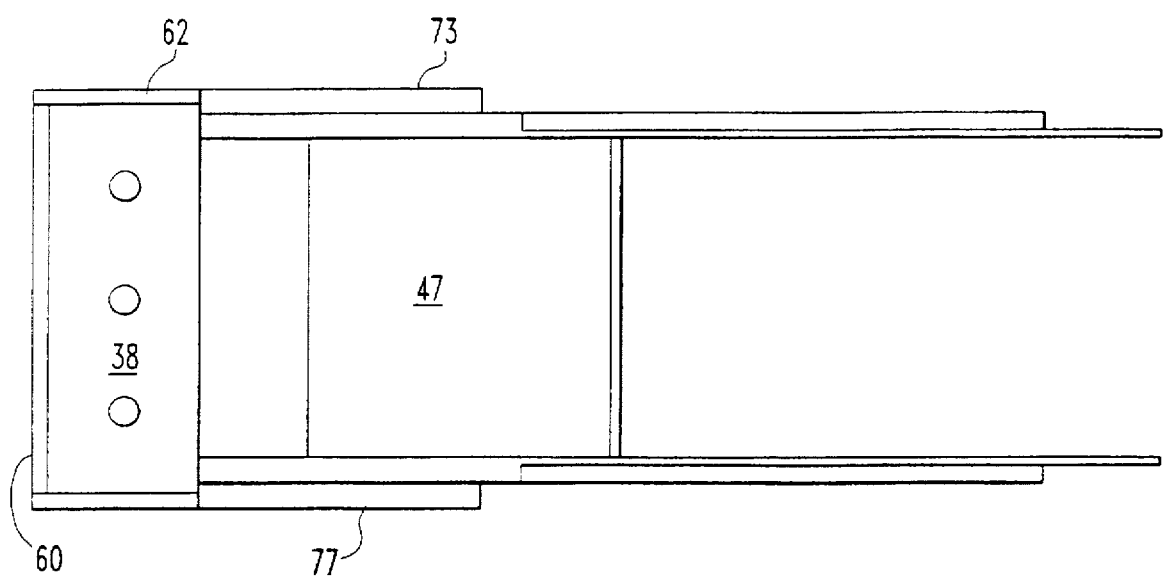

In still another embodiment as shown in FIGS. 6a and 6b, the second portion 32 includes a guard section 60 that is positioned about the rail 102 to which the second portion 32 is attached to protect the same. Preferably, the guard section 60 extends from the contact surface 44 and defines a pocket 62 therewith to receive the bottom 18 of the rail 102. FIG. 6c shows an overhead view of this embodiment of the member 100.

Figure 7:
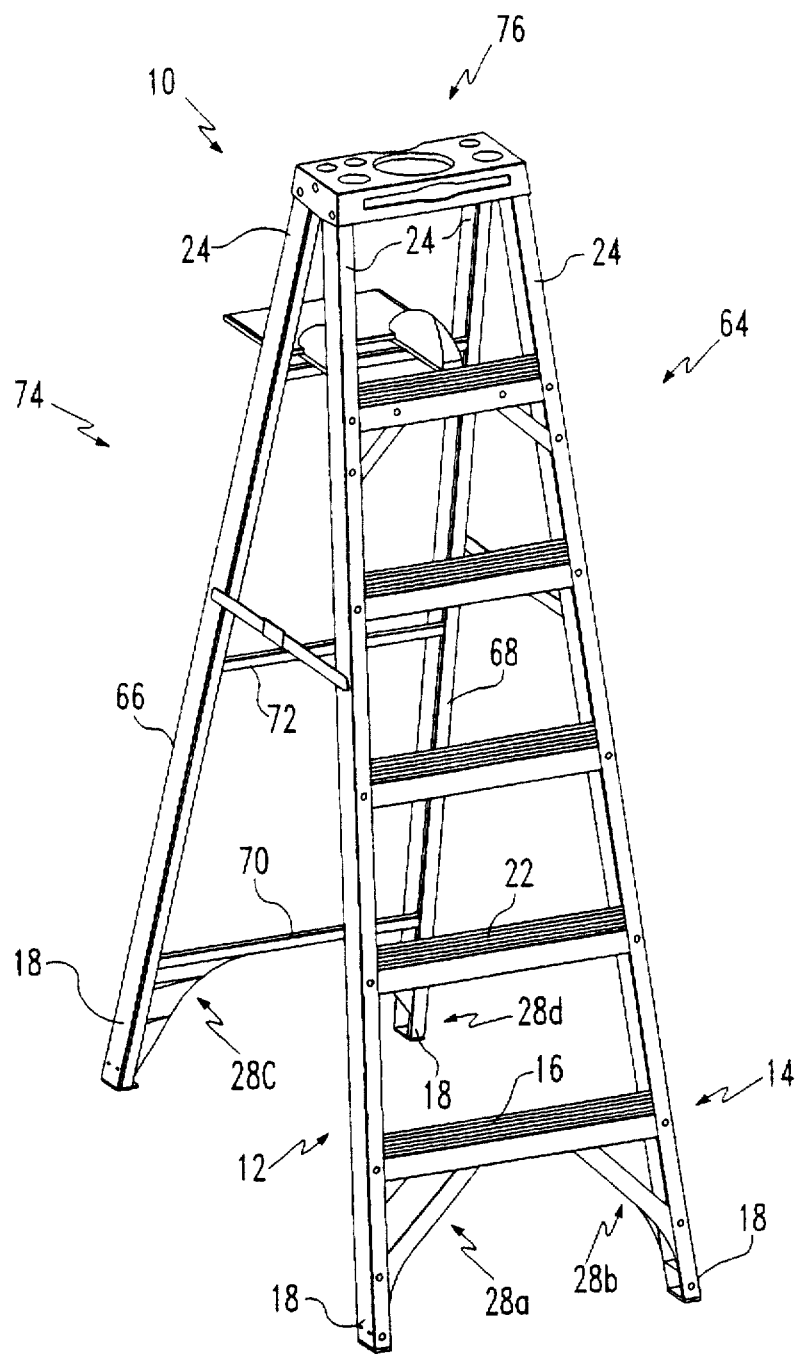
FIG. 7 is a schematic representation of a projected view of a ladder having front members and rear members of the present invention.
Figure 8A:
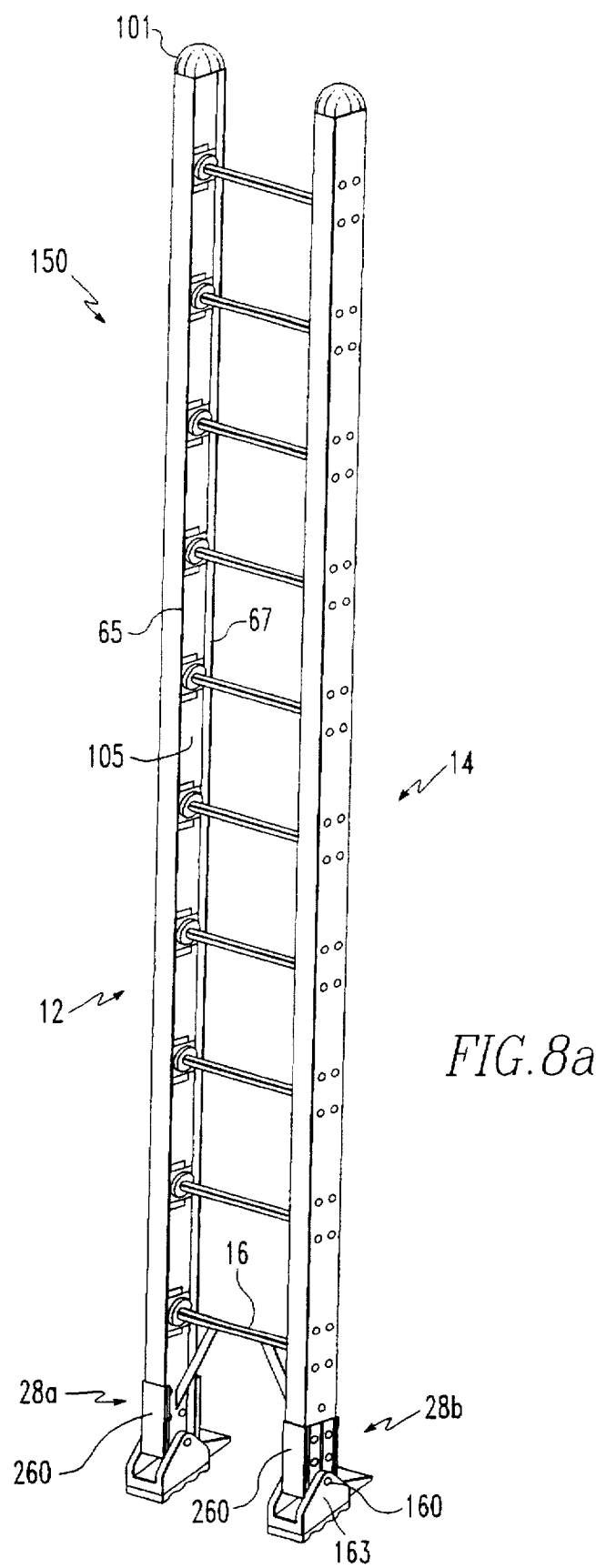
FIGS. 8a and 8b are schematic representations of a straight ladder and an extension ladder, respectively.
Figure 8B:
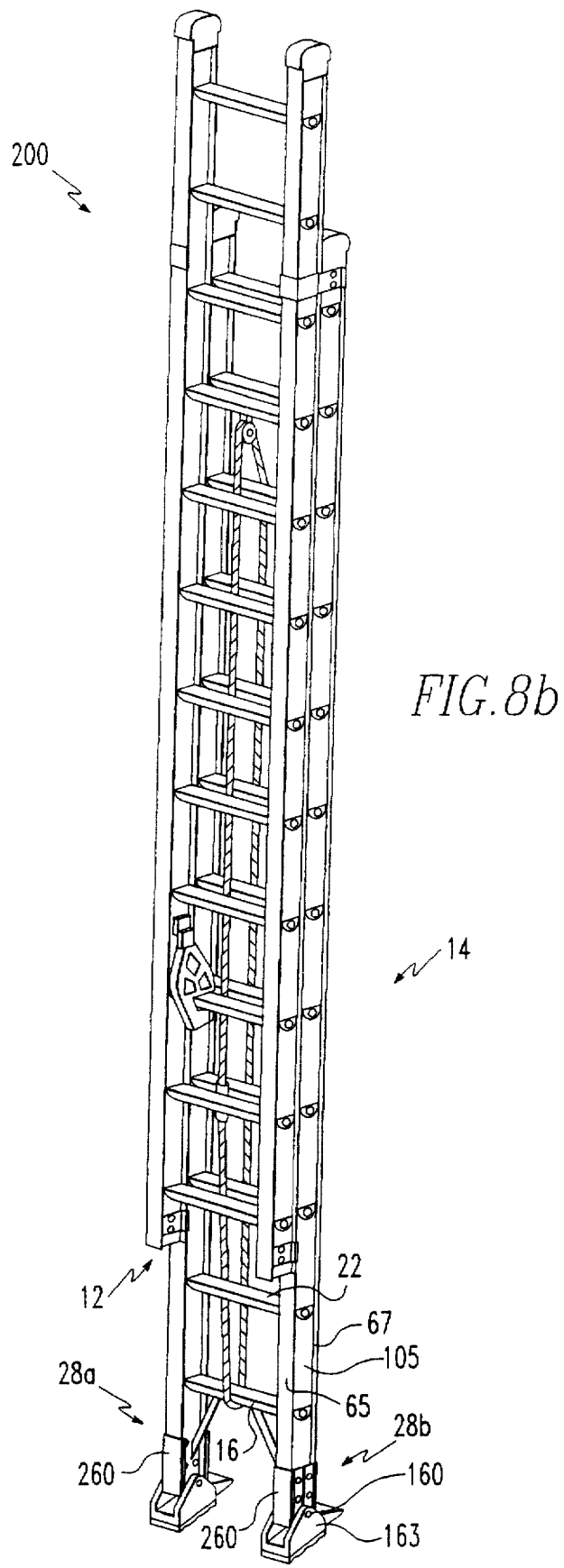

The present invention also pertains to a ladder 10, such as a straight ladder 150 or an extension ladder 200, as shown in FIGS. 8a and 8b, respectively, which is representative of a nonsupporting ladder or a stepladder, as shown in FIG. 7.

The ladder 10 can be made of wood, plastic, fiberglass, aluminum or any material commonly used in the industry, or combinations thereof. The ladder 10 comprises a first side rail 12. The ladder 10 also comprises a second side rail 14 essentially in parallel with and adjacent to the first side rail 12. The ladder 10 also comprises a first step 16 connected to the first side rail 12 in proximity to the bottom 18 of the first side rail and connected to the second side rail 14 in proximity to the bottom 18 of the second side rail and essentially perpendicular with the first side rail 12 and second side rail 14. Additionally, the ladder 10 preferably comprises at least a second step 22 or a top cap 101 connected to the first side rail 12 and second side rail 14 at a location closer to the top 24 of the first side rail 12 and the top 24 of the second side rail 14 than the first step's 16 location relative to the respective top. There is a first front member 28a which is connected to the first side rail 12 and to the first step 16. There is also a second front member 28b which is connected to the second side rail 14 and to the first step 16. Preferably, the first side rail 12, second side rail 14, first step 16, second step 22, first member 28a, second member 28b define a front section 64. The first member 28a and second member 28b preferably are of a configuration as described above and shown in FIGS. 2–2f. Each member preferably has a plurality of apparatuses 111 for holding a washer 120, as described below, so a rivet 51 can be more safely inserted between the desired part of the ladder 10 and the corresponding washer 120 in the apparatus 111 for holding a washer 120 of the corresponding member 28.

The present invention pertains to a method for connecting a member 100 to a ladder 10. The method comprises the steps of inserting a washer 120 into a first apparatus 101 for holding a washer of the member 100. Then there is the step of placing the member 100 in contact with the ladder 10. Next there is the step of riveting the member 100 to the ladder 10 with a rivet 51 which passes through the ladder 10 and the washer 120 in the first apparatus 101 for holding a washer of the member 100.

The placing step preferably includes the step of placing a first portion 30 of the member 100 having a washer 120 in a second apparatus 103 for holding a washer in contact with a horizontal element 104 of the ladder 10. The riveting step preferably includes the step of riveting the first portion 30 of the member 100 to the horizontal element 104 with a rivet 51 which passes through the horizontal element 104 and the washer 120 in the second apparatus 103 for holding a washer of the first portion 30. The placing step preferably also includes the step of placing a second portion 32 of the member 100 having the first apparatus 101 for holding a washer in contact with a rail 102 of the ladder 10. After the step of riveting the first portion 30, preferably there is the step of riveting the second portion 32 of the member 100 to the rail 102 with a rivet 51 which passes through the rail 102 and the washer 120 in the first apparatus 101 for holding a washer of the second portion 32.

The ladder 10 preferably also includes a third side rail 66. There can also be a fourth side rail 68 essentially in parallel with and adjacent to the third side rail 66. The ladder 10 also can include a first horizontal 70 connected to the third side rail 66 in proximity to its bottom 18 and connected to the fourth side rail 68 in proximity to its bottom 18. There can be at least a second horizontal 72 connected to the third and fourth side rails at a location closer to the top 24 of the third side rail 66 and the top 24 of the fourth side rail 68 then the first horizontal's 70 location relative to the respective tops.

Additionally, the ladder 10 can comprise a first rear member 28c connected to the third rail 66 and to the first horizontal 70. Moreover, the ladder 10 can comprise a second rear member 28d connected to the fourth side rail 68 and to the first horizontal 70. The third rail 66, fourth rail 68, first horizontal 70, second horizontal 72, first rear member 28c and second rear member 28d define a rear section 74. The first member 28c and second member 28d preferably are of a configuration as described above and shown in FIGS. 3–3h.

Furthermore, the ladder 10 can comprise a ladder top 76 to which the top 24 of the first rail 12, the top 24 of the second rail 14, the top 24 of the third rail 66 and the top 24 of the fourth rail 68 are connected, as is well known in the art. Preferably, the ladder top 76, front section 64 and rear section 74 form a stepladder.

In the operation of the preferred embodiment, a ladder 10, as shown in FIG. 7, has a front section 64 comprised of a first side rail 12, a second side rail 14, at least a first step 16, a first front member 28a and a second front member 28b connecting the first step 16 to the first side rail 12 and second side rail 14, respectively. The first front member 28a and second front member 28b each have a first portion 30 and a second portion 32. The first portion 30 is connected to the first step 16 of the ladder 10 at a flange portion 48 at a first end 49 of the first portion 30. The second portion 32 of the first front member 28a is connected to the first side rail 12, and the second portion 32 of the second front member 28b is connected to the side rail 14 of the ladder 10. The second portion 32 is also integrally connected to the first portion 30 at the first end 34 of the second portion 32 and to a foot 38 at a second end 36 of the second portion 32.

The second portion 32 has a channel 81 with a contact surface 44 defined by its first arm 73, central body 75 to which the first arm is integrally connected, second arm 77 to which the central body 75 is integrally connected at the end 76 opposite the end 78 the first arm 73 is connected to the central body 75 and the second portion flanges 79, as shown in FIG. 2b. In the channel 81, the respective rail fits with and conforms with the contact surface 44 which extends from the first end 34 of the second portion to the foot 38 that is integrally connected to the second portion 32 at the second portion's second end 36. The respective rail rests against the foot 38 during normal operation. On the foot bottom 42 is a foot pad 40 for gripping the ground when the ladder is in use. The first portion 30 and second portion 32 of each front member 28a, 28b is comprised of cross plates 47 disposed at predetermined positions. The cross plates 47 connect to the first arm 73, central body 75 and second arm 77, as shown in FIG. 2d. These cross plates 47 provide support to the first arm 73, central body 75 and second arm 77 so they do not collapse or fold in when loads they are rated for are placed on them. The cross plates 47 are essentially in place of a solid rectangular shaped cross section with a reduction in weight relative to the weight associated with a solid rectangular shaped cross section.

By the first front member 28a and second front member 28b being comprised of one continuous piece of plastic, it saves time in assembly since only one piece has to be connected to the respective rail and step 16. The presence of the second portion 32 having the contact surface 44 extending from its first end 34 to the foot 38 also provides additional support in regard to forces on the ladder 10 than would otherwise be present if a traditional knee brace only was present connecting the respective rail to the step 16. Forces which are transmitted to the first portion 30 from the rail are in turn transmitted to the second portion and consequently distributed throughout the contact surface 44. Since the contact surface 44 is in contact with the rail, the force being transmitted through the contact surface 44 causes the contact surface 44 to push against the rail. The force is thus transmitted to the rail over essentially the entire contact surface 44 which effectively dissipates the force because it is no longer concentrated at any one localized area. This can be seen, for instance, when a cantilever force is applied to the second portion 32. The force is distributed through the contact surface 44, causing the first arm 73, contact body 75 and second arm 77 to transmit the forces along their length to the rail rather than being focused essentially at the point where the rivet 51 contacts the respective rail. For instance, a horizontal force arising from a user placing his foot in a somewhat horizontal direction relative to the ground onto the corner of the step 16 has the force thereon transferred to the step 16 on which the foot is placed. In turn, this force is transmitted to the rail 12 through the rivet 51b, as shown in FIG. 1, that connects the step 16 to the rail 12. Additionally, force on the step 16 is transferred by the first portion 30 connected with the step 16 to the second portion 32 which is connected also to the rail 12 through rivets 51 and along the contact surface 44. This force is applied to the rail 12 through the first arm 73 and central body 75 which push against the rail 12. Since this force is in the form of a twisting force, the second arm 77 also pushes against the inside portion of the rail 12 to which it contacts. This is because the second arm 77 also experiences the twisting force which tends to attempt to drive it out and away from the rail. However, due to the fact that it conforms with the rail, it instead transfers the force to the rail, rather than twisting out of the rail. In short, due to the length of the second portion 32, a force is dissipated by being distributed over a larger surface area than if there was only a rivet 51 connecting the first portion 30 from the step 16 to the rail 12.

Similarly, a cantilever force applied to the bottom 18 of the first side rail is distributed to the contact surface 44, through the first portion 30 to the step 16. The presence of the second portion 32 extending along the rail through its contact surface 44 thus dissipates the force that would otherwise be mostly absorbed by the rail or concentrated at a rivet 51 if there was no second portion 32 present. Essentially, this same explanation of dissipation of forces is present whether the force arises from a user placing his foot on the first step 16 or a second step 22 that is higher off of the ground, whether the force arises from a user shifting his weight while standing off-center on a step or an external cantilever force is applied to the rail during transportation, such as when it is put in or taken out of a truck, or dropped.

In regard to the first rear member 28c and second rear member 28d, they are connected to the third rail 66 and fourth rail 68, respectively, and to the first horizontal 70 of the rear section 74 of the stepladder 10. Each rear member has a contact surface 44 and a channel 81 as described above in regard to the front members. The important difference, however, is that the first arm 73 of the rear member is shorter than the second arm 77 of the rear member due to the fact that the side rails of the rear section 74 are of essentially this same cross sectional configuration and require the same configuration of the rear members 28c, 28d so they can conform with and contact the rear side rails.

There is a rib 52 which extends from the central body 75 offset from the central body's center 86 which is closer to the first arm 73 than to the second arm 77, as shown in FIG. 3h. The rib 52 extends from the foot 38 to the flange 48 of the first portion 30. The first portion 30 has a first arm 73 connected to a central body 75, and a second arm 77 also connected to the central body 75 at its end 76 opposite the end 78 the first arm 73 is connected to the central body 75, as shown in FIGS. 3a and 3g. The first arm 73 and the second arm 77 in the first portion 30 extends only a small distance relative to the first arm 73 of the second portion 32 to minimize weight in regard to the loads it is required to withstand. The first portion extends at an angle of 42° from the second portion 32. The rib 52 has struts 54 at predetermined locations that support the rib 52 against bending. The rib 52 supports the central body 75 from bending. The first portion 30 of each rear member is connected to the first horizontal 70 through its flange 48 that extends from the first arm 73.

When a cantilever force is applied to the bottom 18 of a rail on the rear section 74, the force is distributed from the rail to the contact surface 44 of the second portion 32. The first arm 73, the central body 75 and the second arm 77 which define the contact surface 44 of the second portion 32 transfers forces either from the rail or to the rail in which they are in contact depending on the direction from where the force arises. Such force is dissipated by it being spread out over the contact surface 44 as opposed to it being localized at a rivet 51 of a normal shaped knee brace that extends essentially only from the rivet 51 on a rail to a horizontal. The forces transmitted to the contact surface 44 from the rail are in turn transferred to the rib 52 and the central body 75, the first arm 73 and the second arm 77 of the first portion 30. The flange 48 connected to the first arm 73 and central body 75 and rib 52 in turn transfers this force to the first horizontal 70. A twisting force transferred through the first portion does not cause the first portion 30 to fail because of the rib 52, which effectively expands the profile of the first portion to better resist twisting or bending forces, but again with minimum weight. The struts 54 serve to support the rib 52 to further strength it against bending or twisting forces. When forces are transmitted through the rear member from the first horizontal 70 to the respective rail, reaction of the rear member is the same except in reverse order. The presence of the second portion 32 allows the force from the horizontal 70 to be diffused along the rail from the contact surface 44 instead of just in the localized area about the rivet hole 83 where the first horizontal 70 is attached to the respective rail or the rivet 51, as described above in regard to the front members with the rails on the front section 64.

Figure 9D:
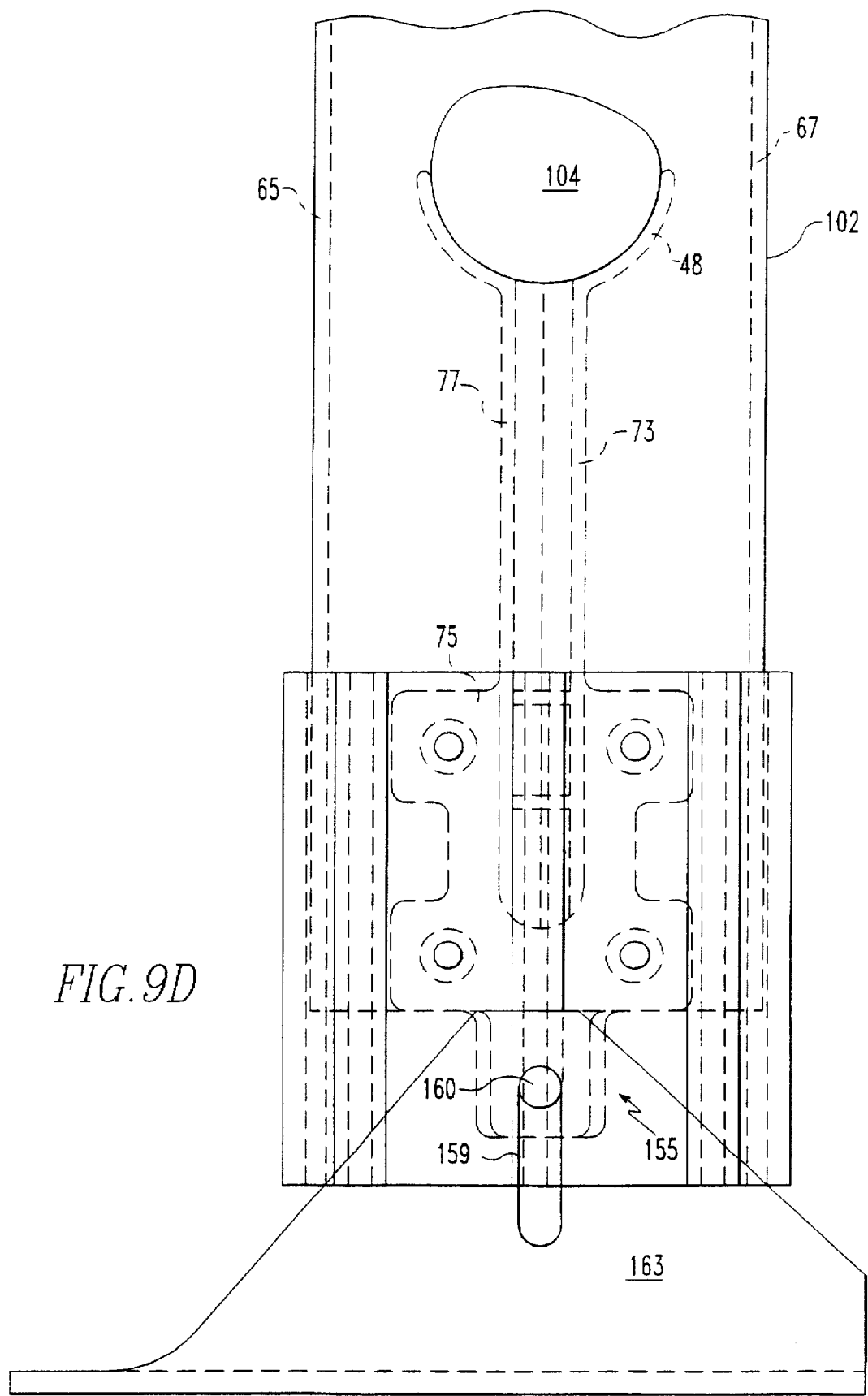
Figure 9E:
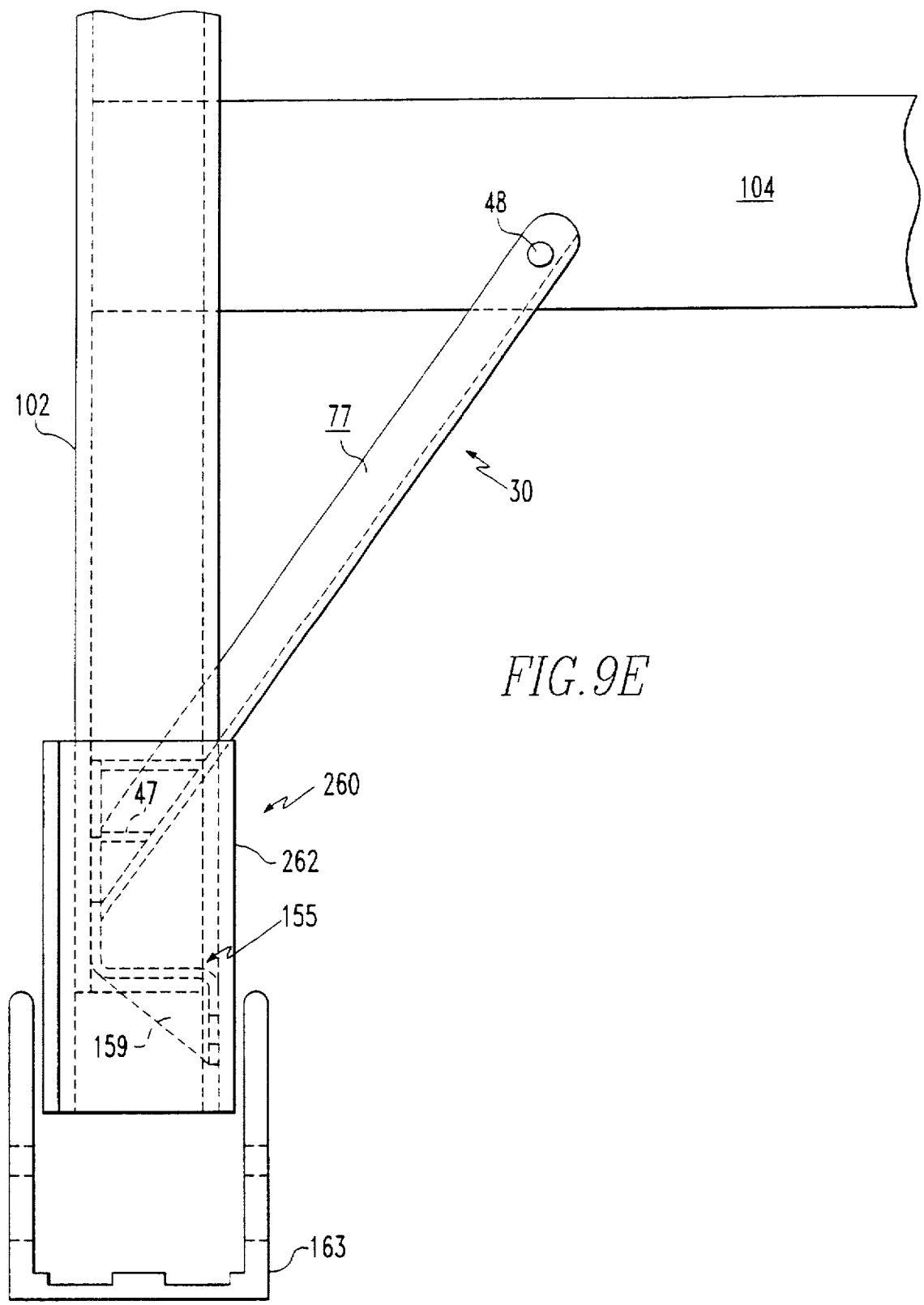

As shown in FIGS. 9a, 9b, 9c, 9d and 9e, another embodiment of a member 100 can be used on a nonsupporting ladder such as an extension ladder or straight ladder. In this embodiment, the member 100 has a first portion 30 which preferably has a V-shaped cross section, as shown in FIG. 9c. The first portion 30 has a first arm 73 and a second arm 77 integrally connected to and in angular relationship with the first arm 73. The first portion 30 preferably has buttressing 46. The buttressing 46 can comprise cross plates 47 to support the first arm 73 and second arm 77. The first portion 30 is also preferably comprised of a flange 48 through which the first portion 30 is attached to the horizontal element 104. For instance, a rivet 51 can be used to connect the flange 48 to the horizontal element 104.

The first portion 30 is integrally connected to a second portion 32 at an angle of 20°–60° and preferably 32°. The second portion 32 is comprised of a central body 75 to which the first arm 73 and second arm 77 are integrally connected and from which they extend. The central body 75 connects to the rail 102 of the nonsupporting ladder through, for instance, rivets 51. The second portion 32 also preferably has a shoe attachment portion 155 that is integrally connected to and extends from the central body 75. The first portion 30 preferably also has a top rib 157 which is integrally connected to and extends from the central body and the first portion 30 to the shoe attachment portion 155. There is a bottom rib 159 which is integrally connected to and extends from the central body 75 to the shoe attachment portion 155 on the opposing side the top rib 157 is connected to it. Preferably, the rib 159 is offset relative to the rib 157, as shown in FIG. 9a. The shoe attachment portion 155 has a hole 161 through which bolt 160 connects a ladder shoe 163 to the rail 102. Of course, the member 100 need not have the shoe attachment portion 155 and the ribs 157, 159.

As shown in FIG. 8a, in regard to a straight ladder 150, and FIG. 8b in regard to an extension ladder 200, a first rail member 28e and a second rail member 28f are used to provide further support. The first rail member 28e and second rail member 28f are preferably of a configuration as described above and shown in FIGS. 9a–9e. The first rail member 28e and the second rail member 28f are connected to the first step 16 and first rail 12 and second rail 14, respectively. The straight ladder 150 and the extension ladder 200 have rail guards 260 that are attached to the bottom 18 of rails 12, 14 and positioned about the outside of the rails 12, 14. The rail guards 260 fit about and grab the first rail flange 65 and second rail flange 67, as shown in FIG. 9d. The shoe attachment portion 155 extends from the central body 75 attached to the central flange 105 of the rails to essentially the outside edge 262 of the rail guard 260 to be flush and even with it. The shoe 163 aligns with the shoe attachment portion 155 so a bolt 160 fits through the hole 161 of the shoe attachment portion 155 and a hole in the central flange 105 of the rail 12, 14 and is attached to the respective rail 12, 14 as is well known in the art. See, for instance, U.S. Pat. No. 5,154,255, incorporated by reference. It should be noted that all embodiments described herein of the member 100 are produced by standard injection molding techniques.

Figure 10A:
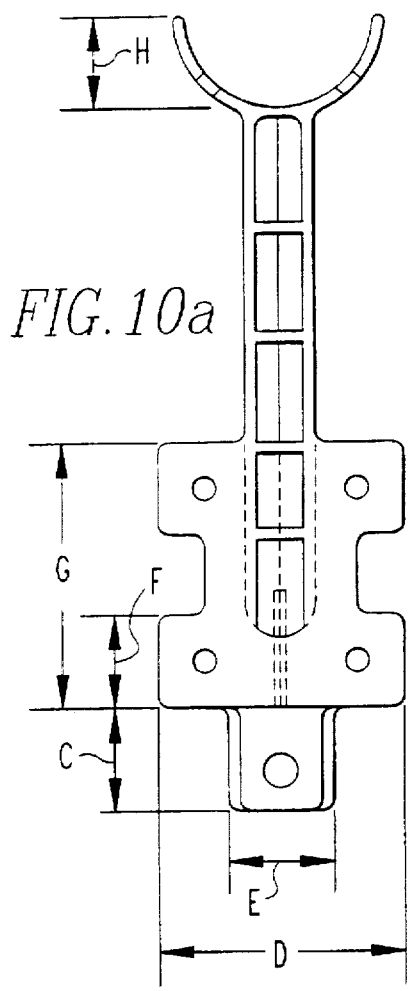
FIGS. 10a, 10b and 10c are schematic representations of a member of the present invention for nonsupporting ladders.
Figure 10B:
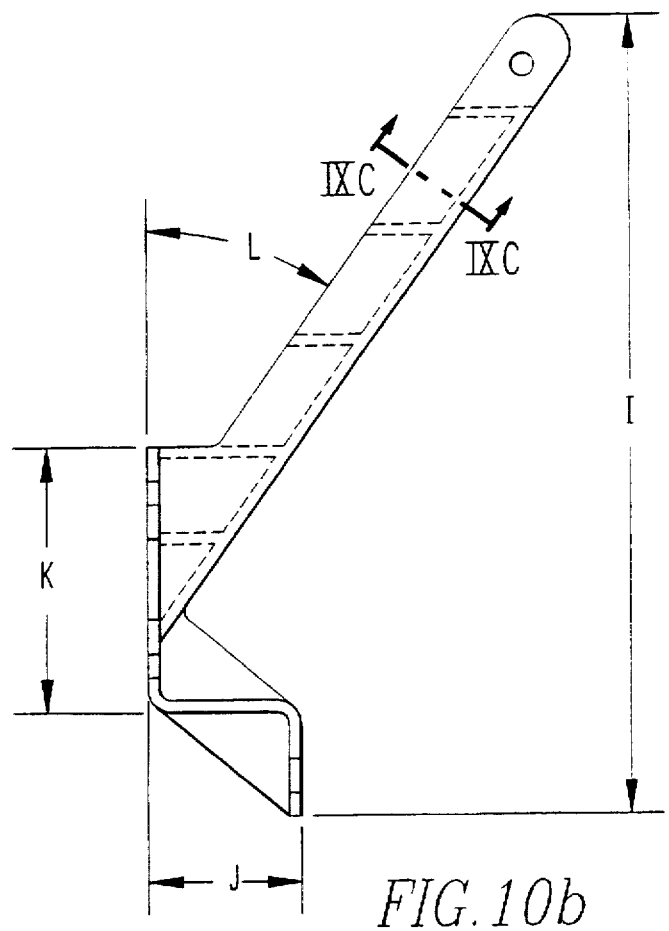
Figure 10C:
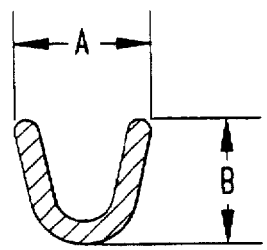
Figure 11A:
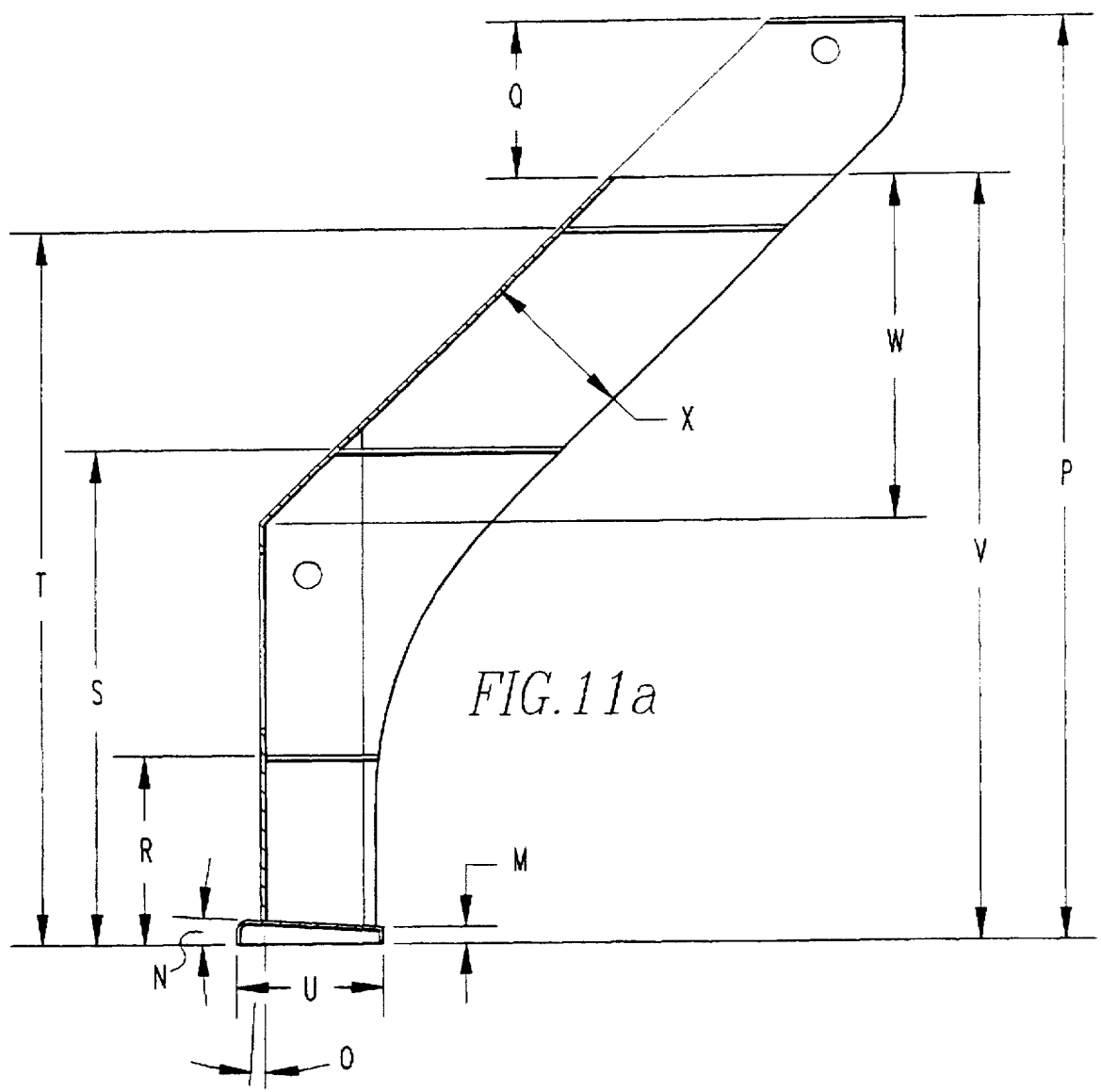
FIGS. 11a and 11b are schematic representations of a member of the present invention for a stepladder.
Figure 11B:
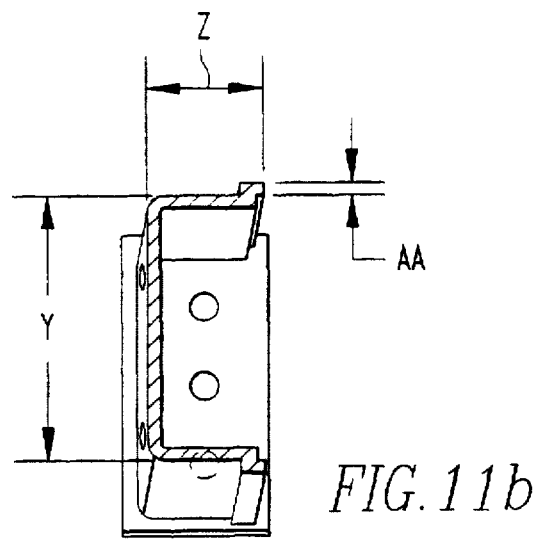
Figure 13:
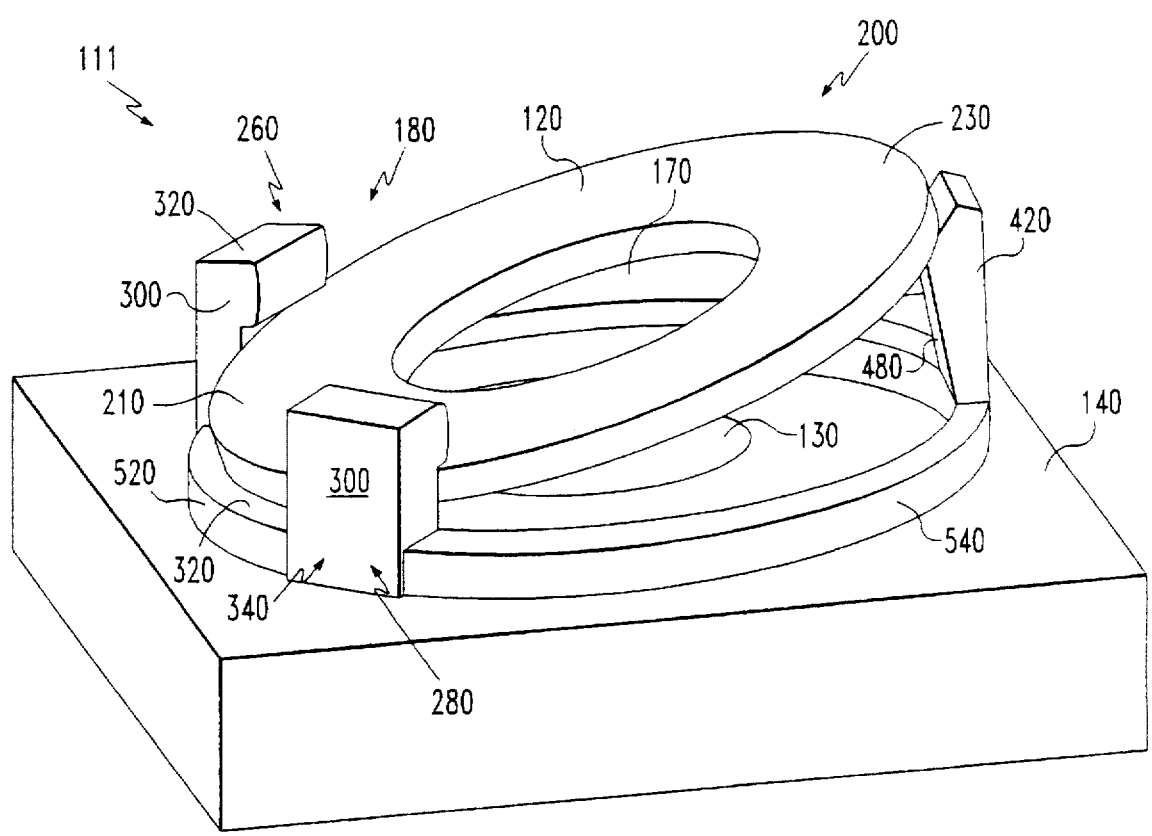
FIG. 13 is a schematic representation of an apparatus for holding a washer of the present invention.
Figure 14:
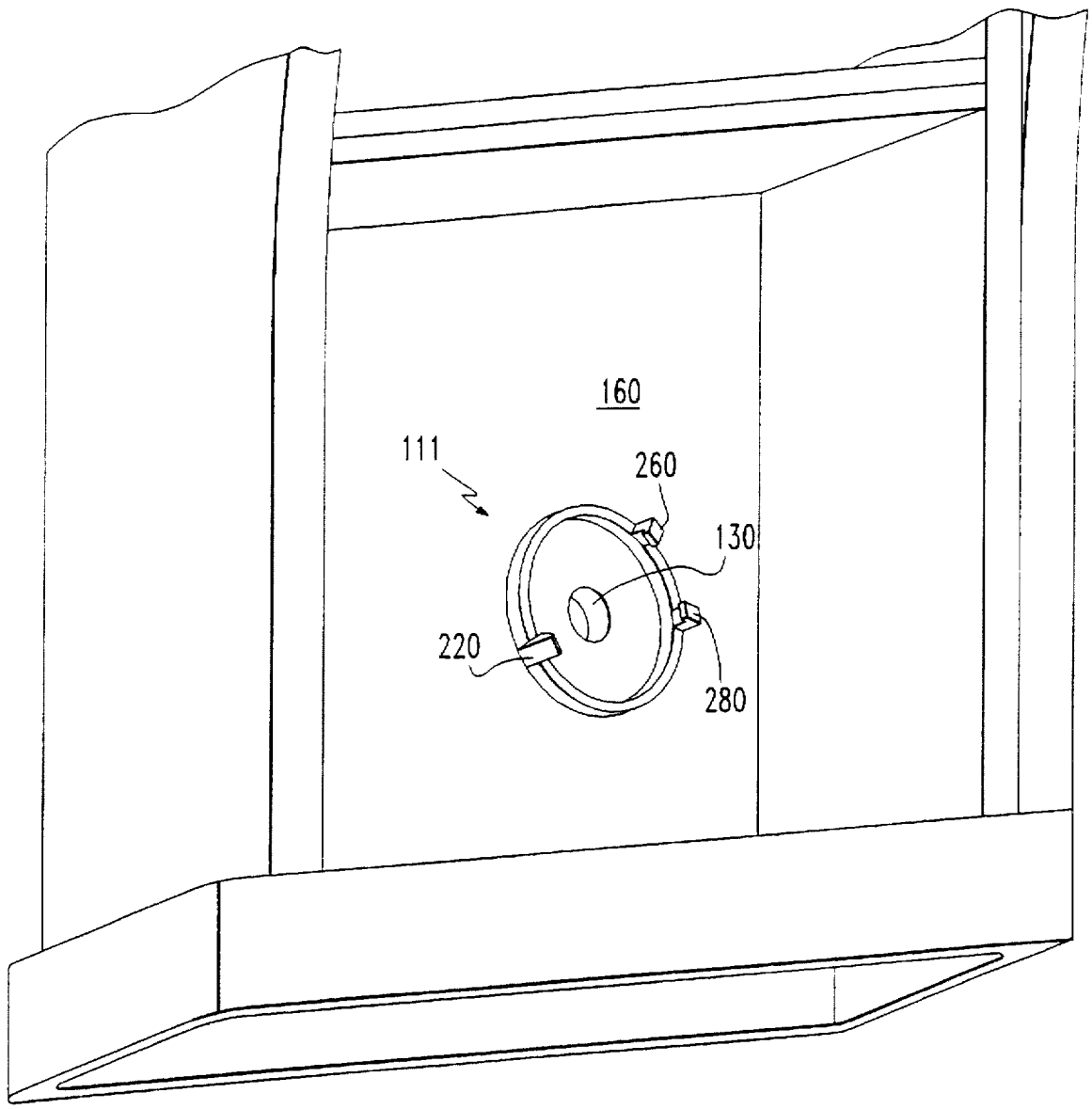
FIG. 14 is a schematic representation of an apparatus for holding a washer of the present invention in a rail protector.
Figure 15:
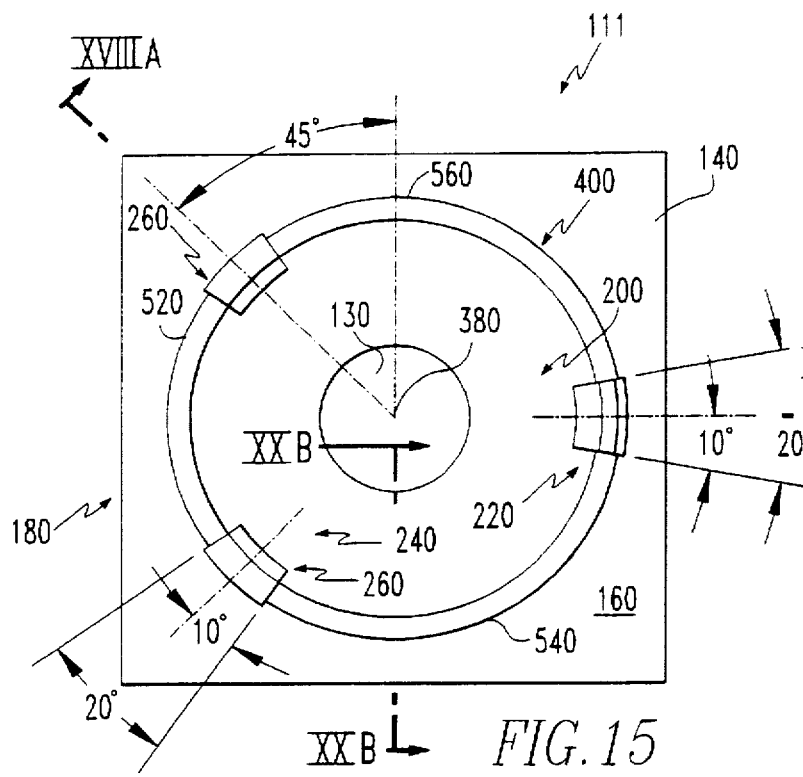
FIG. 15 is an overhead schematic representation of the apparatus.
Figure 16:
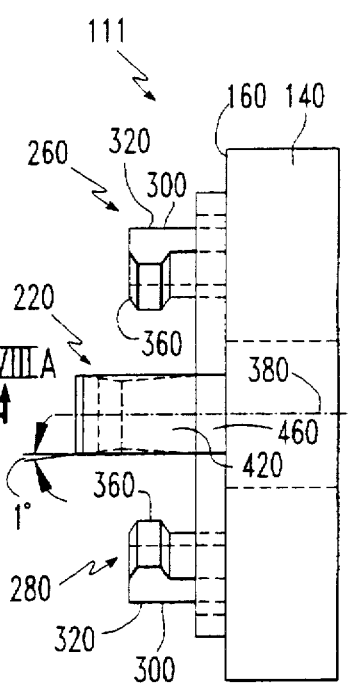
FIG. 16 is a front view of the apparatus.
Figure 17:
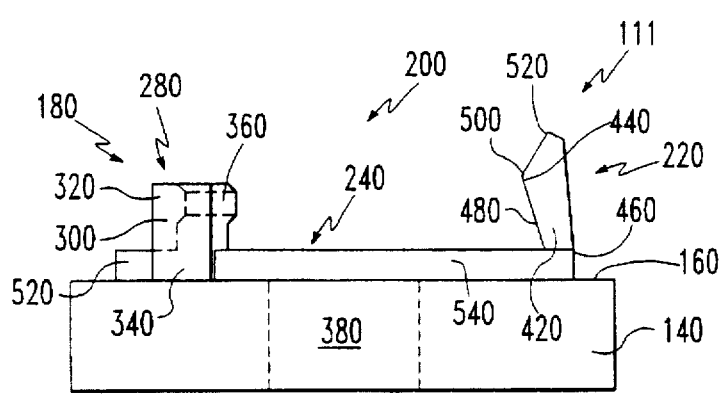
FIG. 17 is a side view of the apparatus.
Figure 21A:
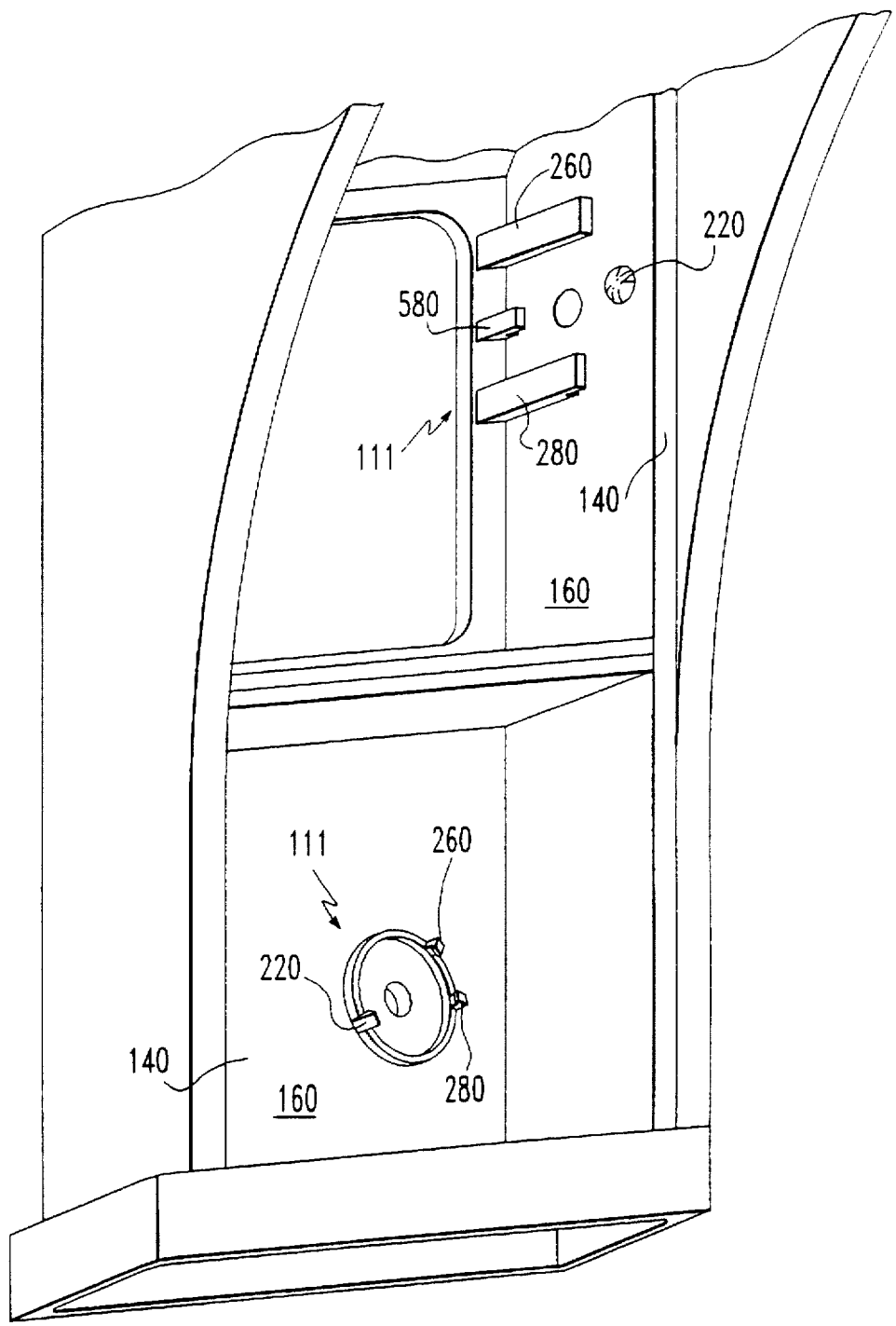
FIG. 21A and 21B are schematic representations of the apparatus that is part of a knee brace-rail-foot for a rail of a ladder.
Figure 21B:
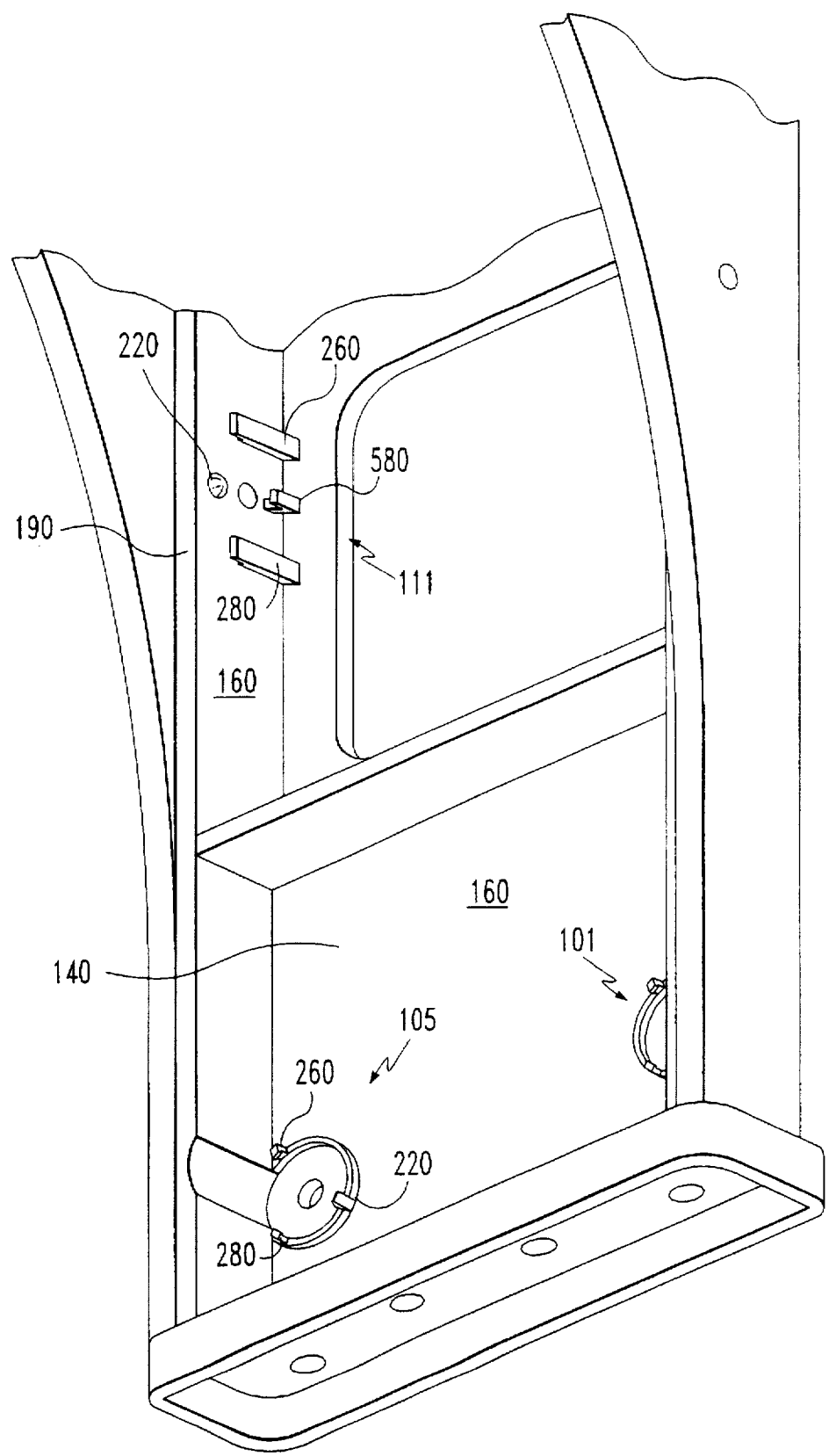
Figure 22:
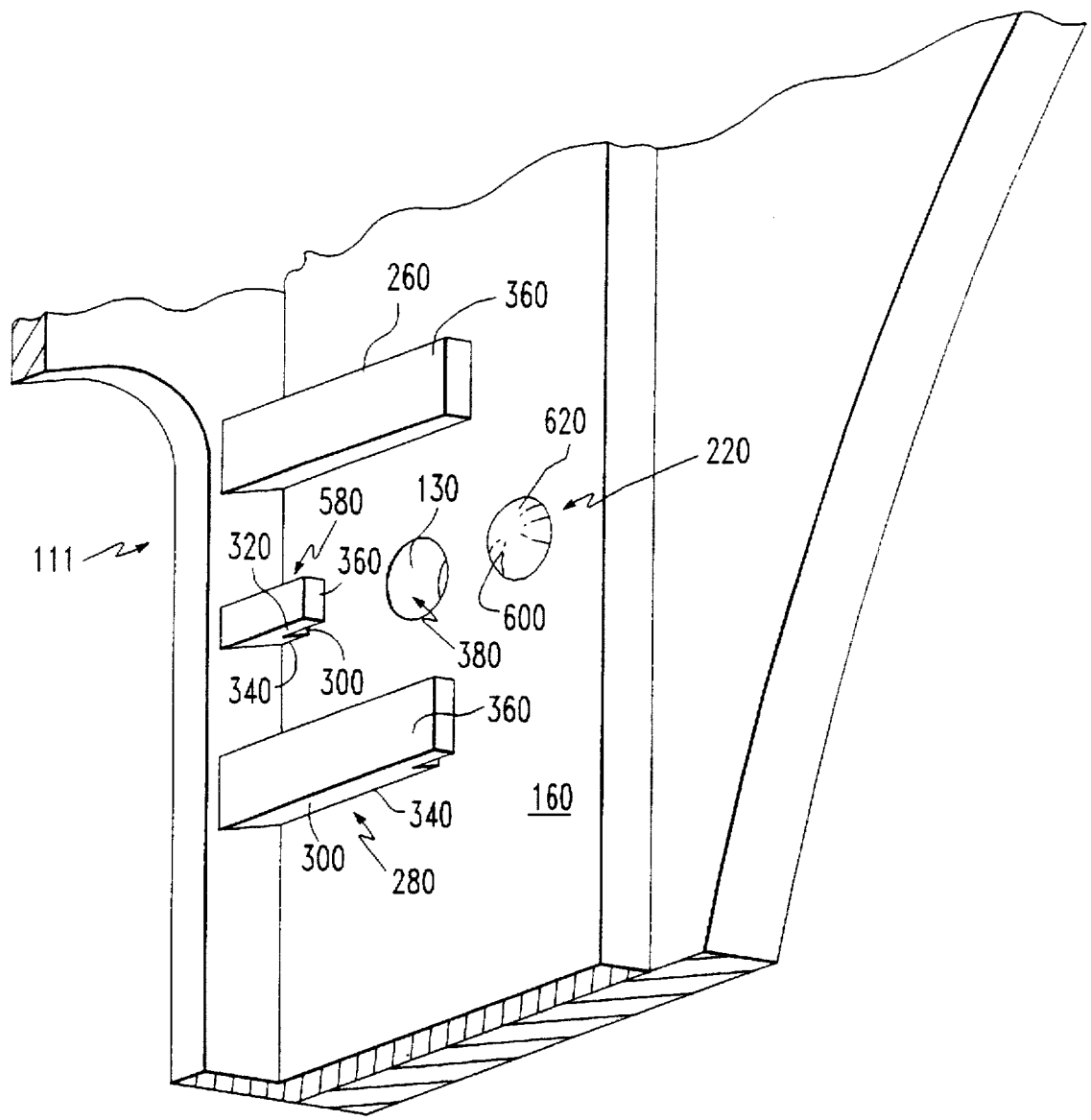
FIG. 22 is a schematic representation of an alternative embodiment of the apparatus for holding a washer of the present invention.

As representative of one embodiment of many possible embodiments whose dimensions and configurations are dictated by the application; the dimensions of a member for a nonsupporting ladder (FIGS. 10a, 10b and 10c), a member for a front section of a stepladder (FIGS. 11a and 11b), and a member for a rear section of a stepladder (FIGS. 12a, 12b, 12c and 12d) are given in the following table.

TABLE

| A | .625 inches | Q | 1.450 | AG | 1.70 |
| B | .625 | R | 2.25 | AH | .186 |
| C | .969 | S | 6.0 | AI | .191 |
| D | 2.188 | T | 9.25 | AJ | 1.117 |
| E | .95 | U | 3.304 | AK | 1.681 |
| F | .813 | V | 9.5 | AL | 2.311 |
| G | 2.313 | W | 4.5 | AM | 5.134 |
| H | .66 | X | 1.750 | AN | 7.888 |
| I | 7.067 | Y | 2.910 | AO | .869 |
| J | 1.212 | Z | 1.050 | AP | 1.322 |
| K | 2.313 | AA | .120 | AQ | 8.019 |
| L | 32° | AB | 1.322 | AR | 9.779 |
| M | .250 | AC | .852 | AS | 77° |
| N | 3.567° | AD | .9 | AT | 4.227 |
| O | 3.567° | AE | .188 | AU | 4.489 |
| P | 10.972 | AF | 1.750 | AV | 1.750 |

Referring now to FIGS. 13–21B, there is shown an apparatus 111 for holding a washer 120. The apparatus 111 comprises a backing 140 having a backing surface 160. The apparatus 111 also comprises a retainer 180 extending from the backing 140. The retainer 180 holds the washer 120. The retainer 180 has a front 200 through which the washer 120 is introduced into the retainer 180. Preferably, the retainer 180 and the backing 140 define a slot 240 in which the washer 120 is held between the backing surface 160 of the backing 140 and the retainer 180.

Additionally, the apparatus 111 comprises a stop 220 extending from the backing. The stop 220 is disposed adjacent to the front 200 of the retainer 180 and prevents the washer 120 from coming out of the retainer 180 when the washer 120 is in the retainer 180. The stop 220 is preferably disposed adjacent to the front 200 of the retainer 180 such that the washer 120 is able to slide past the stop 220 into the retainer 180.

The retainer 180 preferably comprises a first prong 260 disposed adjacent the stop 220. The retainer 180 also comprises at least a second prong 280 disposed adjacent the stop 220 and the first prong 260. Each prong is preferably comprised of a shaft 300 having a top 320 and a bottom 340. The shaft 300 extends from the backing surface 160 at the shaft's bottom 340. Each prong is also comprised of a flange 360. The flange 360 is connected to the shaft 300 and the top 320 of the shaft 300. The flange 360 is in angular relationship with the shaft 300. The flange 360 extends in a direction toward a center 380 defined between the first prong 260, the second prong 280 and the stop 220. Preferably, each shaft 300 extends essentially perpendicular from the backing surface 160, and the flange 360 extends essentially at a perpendicular angle from the top 320 of the shaft 300. Each flange 360 preferably extends a distance from the top 320 of the shaft 300 which is at least enough to cover over at least a portion of the washer 120 when the washer 120 is on the retainer 180.

In one embodiment, the stop 220, the first prong 260 and second prong 280 are disposed essentially equidistantly from each other and define a circle 400 in which the washer 120 is held. The stop 220 is preferably comprised of a post 420 having a top 44 and a bottom 460 that extends from the backing surface 160 at its bottom 26. The post 420 has a first side 480 with a tip 500. The first side 480 angles from the bottom 460 of the post 420 toward the center 380 when the post 420 is in a stable position. The post 420 is bent away from the center 380 by the washer 120 as the washer 120 is slid past the post 420 into the retainer 180 and then restores itself to its stable position. The tip 500 of the post 420 covers over at least a portion of the washer 120 when the washer 120 is in the retainer 180. The post 420 has a second side 520 that is connected to the first side 480 at the tip 500. The second side 520 extends at an angle away from the center 380 from the tip 500 to the top 44 of the post 420 such that when the washer 120 is slid past the post 22, the washer 120 slides along the second side 520 and pushes against the second side 520 causing the post 22 to bend away from the center 380.

The retainer 180 preferably includes a first wall 54 which extends from the backing surface 160 and between the first prong 260 and the stop 220. The retainer 180 also includes a second wall 540 which extends from the backing surface 160 and between the first prong 260 and the second prong 280. Additionally, the retainer 180 includes a third wall 560 which extends from the backing surface 160 and between the second prong 280 and the stop 220. The first, second and third walls are disposed about the circle 400.

In an alternative embodiment, as shown in FIGS. 21–27C—C, the retainer 180 is comprised of three prongs. The third prong 580 is disposed adjacent the first and second prongs and opposing the stop 220. Preferably, the first prong 260 opposes the second prong 280. The backing 140 preferably has an edge 600 which extends from the backing surface 160. Each shaft and flange extends from the edge 600. Preferably, the stop 220 is comprised of a nub 620.

The present invention pertains to a method for holding a washer 120. The method comprises the steps of positioning the washer 120 at a front 200 of a retainer 180. Then there is the step of moving the washer 120 past a stop 220 adjacent the front 200 of the retainer 180. Next there is the step of seating the washer 120 in the retainer 180, with the stop 220 preventing the washer 120 from coming out of the retainer 180.

The seating step preferably includes the step of inserting the washer 120 into a slot 240 of the retainer 180. Preferably, the inserting step includes the step of placing the washer 120 between a first prong 260 and a second prong 280 of the retainer 180. The moving step preferably includes the step of sliding the washer 120 past the stop 220.

In the operation of one embodiment of the invention, as shown in FIGS. 13–21B, a washer 120 is positioned over an apparatus 111 for holding a washer 120. An edge 210 of the washer 120 is angled toward the backing surface 160, and the washer 120 is moved into a position at the front 200 of the retainer 180. The edge 210 of the washer 120 is then moved into the slot 240 defined by the backing surface 160; the shaft 300, which extends from the backing surface 160 at the shaft's bottom 340; and the flange 360 that extends essentially perpendicular from the top 320 of the shaft 300 of the first prong 260 and the second prong 280. To further support the edge 210 of the washer 120 positioned in the slot 240, there is a second wall 540 which extends from the backing surface 160 and between the first prong 260 and the second prong 280. The edge 210 of the washer 120 abuts the second wall 540 when it is angled into the slot 240. The opposing edge 230 of the washer 120 to the edge 210 in the slot 240 is disposed above the second side 520 of a post 420 of the stop 220 at this point of the insertion process. The stop 220, first prong 260 and second prong 280 defines a circle 400.

Force is then applied to the washer 120, causing the opposing edge 230 of the washer 120 to push against the second side 520 of the post 420 and slide along the second side 520 as the post 420 bends away from the washer 120 under the force of the washer 120. The post 420 continues to bend away from the washer 120 as the washer moves downward toward the backing surface 160 under the continued application of force. At the point the opposing edge 230 of the washer 120 has slid relative to the second side 520 to the tip 500, the post 420 has bent enough to allow the opposing edge 230 of the washer 120 to clear the tip 500. The opposing edge 230 of the washer 120 then moves down to the backing surface 160 since there is no longer anything in its way. The post 420, having no further force applied to it from the washer 120, returns to its stable position.

The first side 480 of the post 420 angles from the bottom 460 of the post 420 toward the center 380 when the post 420 is in a stable position. The tip 500 of the post 420 is located at the top end of the first side 480. The post 420, when it is in the stable position, has the tip 500 covering over at least a portion of the washer 120 when the washer 120 is in the retainer 180.

Further containing the washer 120, is a first wall 52 which extends from the backing surface 160 and between the first prong 260 and the stop 220. Additionally, there is a third wall 560 which extends from the backing surface 160 and between the second prong 280 and the stop 220. The first, second and third walls; the first and second prongs with their shaft 300, and the post 420 of the stop 220 all serve to prevent the washer 120 from moving in a direction parallel to the backing surface 160 and out of the apparatus 111. The flange 360 of the first prong 260 and second prong 280, and the first side 480 of the post 420 which angles toward the center 380 of the backing surface 160, all serve to prevent the washer 120 from moving in a direction perpendicular to the backing surface 160 and out of the apparatus 111. Consequently, the washer 120 is maintained in a secure, essentially fixed position by the apparatus 111 so the introduction of a rivet 51 through hole 170 of the washer 120 at a desired time is essentially certain.

In the operation of an alternative embodiment of the apparatus 111 for holding a washer 120, as shown in FIGS. 21–27C—C, the retainer 180 comprises a first prong 260 and a second prong 280 which opposes the first prong 260. There is also a third prong 580 disposed adjacent to the first and second prongs and between them. The backing 140 has an edge 600 which extends from the backing surface 160. Each shaft 300 and flange 360 of the first, second and third prongs extends from the edge 600 and from the backing surface 160. Each shaft 300 and flange 360 of each prong extends essentially parallel with the other shafts and flanges.

At the front 200 of the retainer 180 is positioned the stop 220. The stop 220 comprises a nub 620 which is hemispherical in shape and extends from the backing surface 160. The center diameter 63 of the nub 620 aligns with the shaft 300 of the third prong 580 and is equidistant from the shaft 300 of the first prong 260 and the shaft 300 of the second prong 280.

The placement of a washer 120 into the apparatus 111 begins with moving the washer 120 into a position at the front 200 of the retainer 180. The edge 210 of the washer 120 closest to the front 200 is angled downward toward the backing surface 160 so the edge 210 of the washer 120 clears the nub 620 and is at a level to enter the slot 240 while the remainder of the washer is above the nub 620. The slot 240 is defined by the flange 360 and shaft 300 of each prong and the backing surface 160.

The washer 120, which is at an angle relative to the backing surface 160, moves into the slot 240 as it slides over the nub 620. As the trailing edge 230 of the washer 120 clears the nub 620, the washer 120 becomes essentially parallel with the backing surface 160. At this point, the washer is between the flange 360 of each prong and the backing surface 160.

The location of the shaft 300 of the third prong 580 and the edge of the nub 620 closest to the front 200 of the retainer 180 centers the washer 120 in a first direction so the hole 130 of the washer 120 aligns with the hole 170 of the backing 140 and a rivet 51 can be inserted through both of them. Similarly, the shaft 300 of the first prong 260 and the second prong 280 are located so as to cause the washer 120 to be aligned with the hole 170 of the backing 140 so a rivet 51 can be inserted into the hole 170 of the backing 140 and the hole 130 of the washer 120.

The shaft 300 of the first and second prongs prevent the washer 120 from moving out of the apparatus 111 in a second direction parallel to the backing surface 160. The nub 620 and the shaft 300 of the third prong 580 prevent the washer 120 from moving out of the apparatus 111 in the first direction parallel to the backing surface 160. Additionally, the position of the third prong 580 and the nub 620 relative to the first and second prongs prevents the washer 120 from moving out of the apparatus 111 through the spaces between the nub 620 or the third prong 580 and the first and second prongs, respectively, in a direction parallel to the backing surface 160.

The flange 360 of the first, second and third prongs prevent the washer 120 from moving out of the apparatus 111 in a direction perpendicular to the backing surface 160. Furthermore, the presence of the nub 620 prevents the washer 120 from moving in a direction parallel to the backing surface 160 to clear the flange 360 of the first, second and third prongs and moving out of the apparatus 111 in a direction perpendicular to the backing surface 160.

The retainer 180 of the apparatus 111 holds the washer 120 in place to receive a rivet 51. The use of the apparatus 111 obviates the need for a person to hold or place a washer 120 over the riveter pin of a riveter. The danger of damage to a person's fingers from the operation of the riveter is eliminated or greatly reduced.

Figure 32:
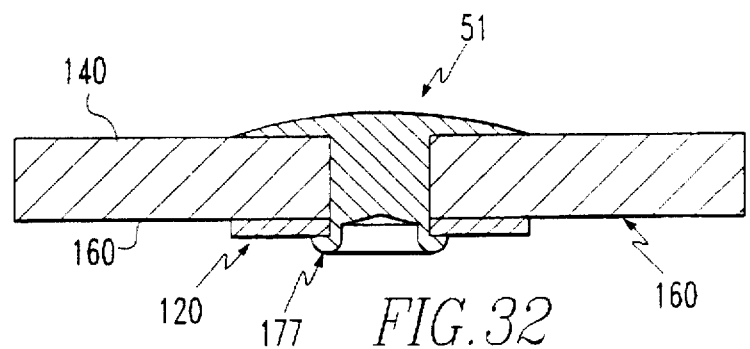
FIG. 32 is a schematic representation of a cross sectional view of a rivet in plastic.
Figure 33:
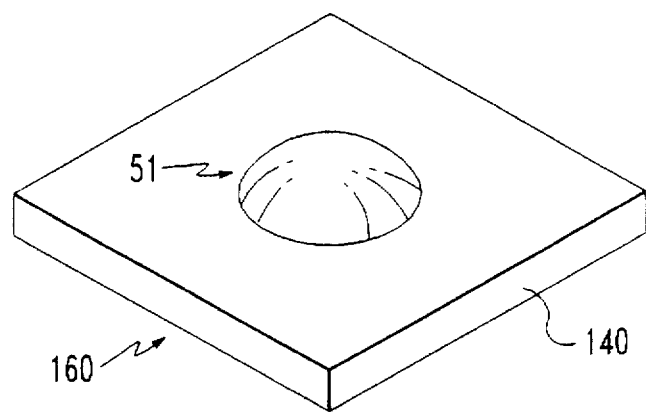
FIG. 33 is a schematic representation of a top view of a rivet in plastic.
Figure 34:
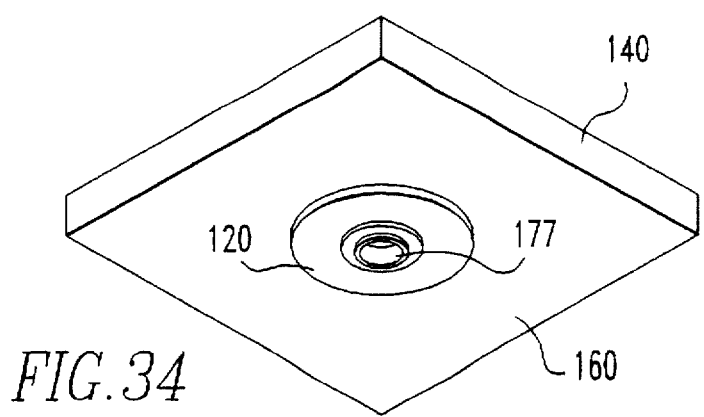
FIG. 34 is a schematic representation of a bottom view of a rivet in a backing made of plastic.
Figure 6B:
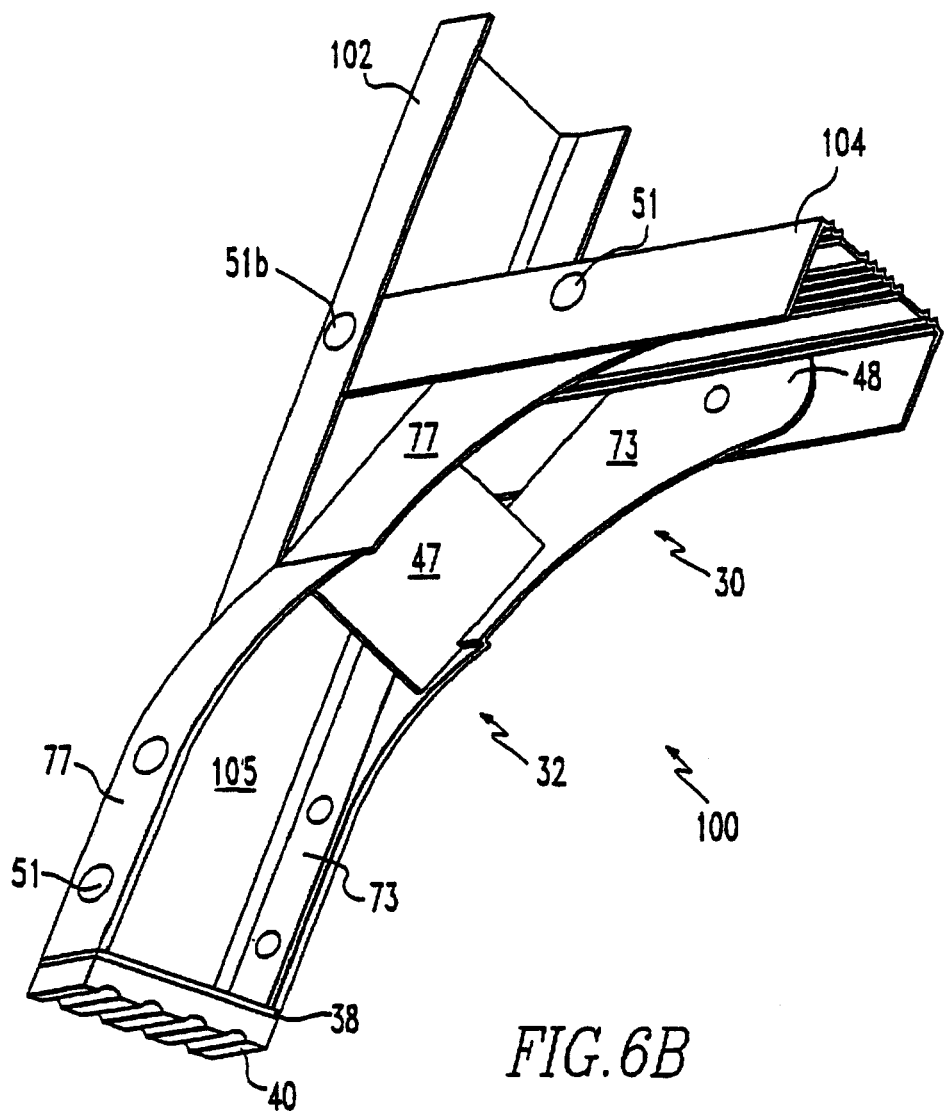

FIG. 32 shows generally a rivet 51 in place in a backing 140 holding the washer 120. The washer 120 is held in place by the rivet upset 177. FIG. 33 shows the top of the rivet 51 in place on the backing 140 opposite the backing surface 160.

The members, as described above, having any desired number of apparatuses 111 for holding washers 120, can be riveted to the corresponding portions of the ladder 10 in the aforementioned manner.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A ladder comprising:
a first side rail;
a second side rail essentially in parallel with and adjacent to the first side rail;
a first step connected to the first side rail in proximity to its bottom and connected to the second side rail in proximity to its bottom and essentially perpendicular with the first and second side rails;
a first front member connected to the first side rail and the first step; and
a second front member connected to the second side rail and to the first step, each front member comprising:
a first portion that connects to the first step; and
a second portion which connects to the rail and extends essentially in parallel with the rail of the ladder, said second portion integrally connected to the first portion such that the first portion and second portion are one continuous piece, said second portion in an angular relationship of less than 90° with said first portion, said second portion having at least a first apparatus for holding a washer, said first apparatus for holding a washer comprising:
a backing having a backing surface; and
a retainer extending from the backing said retainer holding the washer, said retainer having a front through which the washer is introduced into the retainer; and
a stop extending from the backing, said stop disposed adjacent to the front of the retainer and preventing the washer from coming out of the retainer when the washer is in the retainer.

2. A ladder as described in claim 1 wherein the first portion includes a second apparatus for holding a washer.

3. A ladder as described in claim 2 wherein each second portion has a foot and including a foot pad to contact ground when the rail to which it is attached is in operable position, said pad attached to the bottom of the foot.

4. A ladder as described in claim 3 wherein the second portion has a contact surface which extends along and conforms with the rail to which it is attached so forces can be transferred therebetween.

5. A ladder as described in claim 4 wherein the first portion includes a flange portion which connects to the horizontal member, said flange portion having the second apparatus for holding a washer.

6. A ladder as described in claim 5 wherein the first and second portions have buttressing and wherein the first portion and second portion are C-shaped and have a first arm, a central body connected to the first arm and a second arm connected to the central body and opposing the first arm; said first arm, second arm and central body of the second portion having the first apparatus for holding a washer and a third and fourth apparatus for holding a washer, respectively, and wherein the buttressing includes cross plates disposed in predetermined locations in the C-shape of the first and second portions, said cross plates forming one continuous piece with the first and second portions.

7. A ladder as described in claim 5 wherein the first and second portions have buttressing and wherein the buttressing includes a rib extending along the first and second portions and connected to the flange portion, said second portion having a first arm and a central body connected to the first arm from which the first arm and rib extends, said first arm having the first apparatus for holding a washer, and said central body having a third apparatus for holding a washer, said rib having struts, said rib, struts and first and second portions being one continuous piece.

8. A ladder as described in claim 1 wherein the retainer and the backing define a slot in which the washer is held between the backing surface of the backing and the retainer.

9. A ladder as described in claim 8 wherein the stop is disposed adjacent to the front of the retainer such that the washer is able to slide past the stop into the retainer.

10. A ladder as described in claim 9 wherein the retainer comprises a first prong disposed adjacent the stop, and at least a second prong disposed adjacent the stop and the first prong.

11. A ladder as described in claim 10 wherein each prong is comprised of a shaft having a top and a bottom, said shaft extending from the backing surface at the shaft's bottom; and a flange, said flange connected to said shaft and said shaft's top, said flange in angular relationship with said shaft, said flange extending in a direction towards a center defined between the first prong, second prong and stop.

12. A ladder as described in claim 11 wherein each shaft extends essentially perpendicular from the backing surface, and the flange extends essentially perpendicularly from the top of the shaft.

13. A ladder as described in claim 12 wherein each flange extends a distance from the top of the shaft which is at least enough to cover over at least a portion of the washer when the washer is on the retainer.

14. A ladder as described in claim 13 wherein the stop, first prong and second prong are disposed essentially equidistant from each other and define a circle in which the washer is held.

15. A ladder as described in claim 14 wherein the stop is comprised of a post having a top and a bottom that extends from the backing surface at its bottom, said post having a first side with a tip, said first side angles from the post's bottom toward the center when the post is in a stable position, said post being bent away from the center by the washer as the washer is slid past the post into the retainer and then restoring itself to its stable position, said tip of said first side covering over at least a portion of the washer when the washer is in the retainer.

16. A ladder as described in claim 15 wherein the post has a second side that is connected to the first side at the tip, said second side extending angularly away from the center from the tip to the top of the post such that when the washer is slid past the post, the washer slides along the second side and pushing against the second side causing the post to bend away from the center.

17. A ladder as described in claim 16 wherein the retainer includes a first wall which extends from the backing surface and between the first prong and the stop; a second wall which extends from the backing surface and between the first prong and the second prong; and a third wall which extends from the backing surface and between the second prong and the stop; said first, second and third walls disposed about the circle.

18. A ladder as described in claim 13 wherein the retainer is comprised of a third prong disposed adjacent the first and second prongs and opposing the stop.

19. A ladder as described in claim 18 wherein the first prong opposes the second prong.

20. A ladder as described in claim 19 wherein the backing has an edge which extends from the backing surface, and each shaft and flange extends from the edge.

21. A ladder as described in claim 10 wherein the stop is comprised of a nub.

22. A ladder as described in claim 21 wherein the first portion includes a second apparatus for holding a washer.

23. A ladder as described in claim 22 including a foot pad to contact ground when the rail to which it is attached is in operable position, said pad attached to the bottom of the foot.

24. A ladder as described in claim 23 wherein the second portion has a contact surface which extends along and conforms with the rail to which it is attached so forces can be transferred therebetween.

25. A ladder as described in claim 24 wherein the first portion includes a flange portion which connects to the horizontal member, said flange portion having the second apparatus for holding a washer.

26. A ladder as described in claim 25 wherein the first portion and second portion are C-shaped and have a first arm, a central body connected to the first arm and a second arm connected to the central body and opposing the first arm; said first arm, second arm and central body of the second portion having the first apparatus for holding a washer and a third and fourth apparatus for holding a washer, respectively, and wherein the buttressing includes cross plates disposed in predetermined locations in the C-shape of the first and second portions, said cross plates forming one continuous piece with the first and second portions.

27. A ladder as described in claim 26 wherein the buttressing includes a rib extending along the first and second portions and connected to the flange portion, said second portion having a first arm and a central body connected to the first arm from which the first arm and rib extends, said first arm having the first apparatus for holding a washer, and said central body having a third apparatus for holding a washer, said rib having struts, said rib, struts and first and second portions being one continuous piece.

28. A ladder comprising:
a first side rail having a first rail flange and second rail flange;
a second side rail essentially in parallel with and adjacent to the first side rail, said second side rail having a first rail flange and a second rail flange;
a horizontal element connected to the first side rail in proximity to its bottom and connected to the second side rail in proximity to its bottom and essentially perpendicular with the first and second side rails;
a first front member connected to the first side rail and the horizontal element; and
a second front member connected to the second side rail and to the horizontal element, each front member comprising:
a first arm which connects to the first rail flange and the horizontal member, said first arm having a first apparatus for holding a washer;
a second arm which connects to the second rail flange and the horizontal member, said second arm having a second apparatus for holding a washer; and
a central body which is integrally connected to the second arm and the first arm, said first arm, second arm and central body being one continuous piece, said central body having a third apparatus for holding a washer each apparatus for holding a washer comprising:
a backing having a backing surface; and
a retainer extending from the backing said retainer holding the washer, said retainer having a front through which the washer is introduced into the retainer; and
a stop extending from the backing said stop disposed adjacent to the front of the retainer and preventing the washer from coming out of the retainer when the washer is in the retainer.

* * * * *

UNITED STATES PATENT AND TRADEMARK OFFICE
CERTIFICATE OF CORRECTION

PATENT NO. : 5,791,439
APPLICATION NO. : 08/426194
DATED : August 11, 1998
INVENTOR(S) : David E. Plotner et al.

Page 1 of 2

It is certified that error appears in the above-identified patent and that said Letters Patent is hereby corrected as shown below:

Drawings:
Delete Fig. 6B and substitute therefor Fig. 6B as shown on the attached page Signed and Sealed this Thirtieth Day of March, 2010

David J. Kappos
*Director of the United States Patent and Trademark Office*